(12) United States Patent
Pittack

(10) Patent No.: US 11,244,299 B1
(45) Date of Patent: Feb. 8, 2022

(54) LOCATION-BASED TRANSACTION COMPLETION

(71) Applicant: DOORDASH, INC., San Francisco, CA (US)

(72) Inventor: Daniel Alexander Pittack, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 519 days.

(21) Appl. No.: 15/922,984

(22) Filed: Mar. 16, 2018

(51) Int. Cl.
*G06Q 20/20* (2012.01)
*G06Q 10/08* (2012.01)
*G06Q 50/12* (2012.01)
*G06Q 20/32* (2012.01)

(52) U.S. Cl.
CPC ....... *G06Q 20/209* (2013.01); *G06Q 10/0835* (2013.01); *G06Q 20/3278* (2013.01); *G06Q 50/12* (2013.01)

(58) Field of Classification Search
CPC .. G06Q 20/209; G06Q 50/12; G06Q 10/0835; G06Q 20/3278
See application file for complete search history.

(56) References Cited

U.S. PATENT DOCUMENTS

| | | |
|---|---|---|
| 5,991,739 A | 11/1999 | Cupps et al. |
| 6,474,159 B1 | 11/2002 | Foxlin et al. |
| 7,177,825 B1 | 2/2007 | Borders et al. |
| 7,233,914 B1 | 6/2007 | Wijaya et al. |
| 7,844,497 B2 | 11/2010 | Phillips et al. |
| 7,895,129 B2 | 2/2011 | Phillips et al. |
| D695,762 S | 12/2013 | Tagliabue et al. |

(Continued)

FOREIGN PATENT DOCUMENTS

| | | |
|---|---|---|
| WO | 2012/135143 A2 | 10/2012 |
| WO | 2018/064312 A1 | 4/2018 |

OTHER PUBLICATIONS

Priti Chakurkar, An Internet of Things (IOT) based monitoring system for efficient milk distribution, Dec. 1, 2017, 2017 International Conference on Advances in Computing, Communication and Control (ICAC3,) pp. 1-5 (Year: 2017).*

(Continued)

*Primary Examiner* — Mehmet Yesildag
*Assistant Examiner* — Aaron N Tutor
(74) *Attorney, Agent, or Firm* — Mattingly & Malur, PC

(57) ABSTRACT

In some examples, a computing device may receive, from a merchant application on a merchant device, an indication that a buyer has initiated a transaction to purchase an item from a merchant associated with the merchant device. A first fulfilment selection may initially be associated with the transaction. The computing device may determine an association of the buyer with a buyer account. A buyer device having a buyer application executable thereon may be associated with the buyer account. The computing device may send, to the buyer application, transaction information related to the transaction to enable the buyer to pay for the transaction via the buyer application and/or change the fulfilment selection for the transaction. The computing device may receive, from the buyer application, at least one of an indication of authorization of payment for the transaction or an indication of a change to the fulfilment selection.

20 Claims, 13 Drawing Sheets

(56) References Cited

U.S. PATENT DOCUMENTS

| | | | |
|---|---|---|---|
| 8,626,609 B1 | 1/2014 | Vippagunta | |
| 8,635,113 B2 | 1/2014 | Borders et al. | |
| D699,252 S | 2/2014 | Tagliabue et al. | |
| 8,700,443 B1 | 4/2014 | Murray et al. | |
| 8,712,924 B2 | 4/2014 | Marks et al. | |
| D718,322 S | 11/2014 | Hwang et al. | |
| 9,269,103 B1* | 2/2016 | Kumar | G06Q 10/0835 |
| D753,172 S | 4/2016 | Kim | |
| D754,176 S | 4/2016 | Kim | |
| 9,430,777 B1 | 8/2016 | Strand | |
| D767,611 S | 9/2016 | Kirby et al. | |
| D769,887 S | 10/2016 | Wilberding et al. | |
| D773,503 S | 12/2016 | Kim | |
| 9,552,564 B1 | 1/2017 | Martenis | |
| D790,587 S | 6/2017 | Sun | |
| 9,811,838 B1 | 11/2017 | Daire et al. | |
| 9,928,540 B1* | 3/2018 | Gerard | G06Q 30/0635 |
| 9,934,530 B1 | 4/2018 | Iacono et al. | |
| D823,315 S | 7/2018 | Lin et al. | |
| 10,032,210 B2 | 7/2018 | Lutnick et al. | |
| 10,043,149 B1 | 8/2018 | Iacono et al. | |
| 10,127,595 B1 | 11/2018 | Hipschman et al. | |
| 10,133,995 B1 | 11/2018 | Reiss et al. | |
| 10,321,263 B1* | 6/2019 | AlKarmi | G06Q 30/0601 |
| 10,366,436 B1 | 7/2019 | Kumar et al. | |
| 2002/0107820 A1 | 8/2002 | Huxter | |
| 2002/0143655 A1 | 10/2002 | Elston et al. | |
| 2002/0188517 A1 | 12/2002 | Banerjee et al. | |
| 2002/0198818 A1 | 12/2002 | Scott et al. | |
| 2003/0065574 A1 | 4/2003 | Lawrence | |
| 2003/0078873 A1 | 4/2003 | Cohen | |
| 2003/0200111 A1 | 10/2003 | Damji | |
| 2006/0010037 A1 | 1/2006 | Angert et al. | |
| 2006/0041481 A1 | 2/2006 | Stowe | |
| 2007/0162353 A1 | 7/2007 | Borders et al. | |
| 2007/0185785 A1 | 8/2007 | Carlson et al. | |
| 2009/0106124 A1 | 4/2009 | Yang | |
| 2009/0254445 A1 | 10/2009 | Bennett et al. | |
| 2009/0307096 A1 | 12/2009 | Antonellis | |
| 2010/0114790 A1 | 5/2010 | Strimling et al. | |
| 2010/0125494 A1 | 5/2010 | Boss et al. | |
| 2010/0250384 A1 | 9/2010 | Bhargava | |
| 2010/0325000 A1 | 12/2010 | Teraoka | |
| 2012/0173308 A1 | 7/2012 | Brown et al. | |
| 2013/0006739 A1 | 1/2013 | Horvitz et al. | |
| 2013/0080280 A1 | 3/2013 | Scipioni | |
| 2013/0218727 A1 | 8/2013 | Lutnick et al. | |
| 2013/0346237 A1 | 12/2013 | Rademaker | |
| 2014/0025524 A1 | 1/2014 | Sims et al. | |
| 2014/0058902 A1 | 2/2014 | Taylor et al. | |
| 2014/0095311 A1 | 4/2014 | Bulloch, Jr. | |
| 2014/0279652 A1 | 9/2014 | Kim et al. | |
| 2014/0279667 A1 | 9/2014 | Gillen | |
| 2014/0289031 A1 | 9/2014 | Comerford et al. | |
| 2014/0297470 A1 | 10/2014 | Ramadge et al. | |
| 2014/0330739 A1 | 11/2014 | Falcone et al. | |
| 2014/0370167 A1 | 12/2014 | Garden | |
| 2015/0052000 A1 | 2/2015 | Apsley et al. | |
| 2015/0128076 A1 | 5/2015 | Fang et al. | |
| 2015/0142594 A1 | 5/2015 | Lutnick et al. | |
| 2015/0161667 A1 | 6/2015 | Stevens et al. | |
| 2015/0178778 A1 | 6/2015 | Lee et al. | |
| 2015/0186869 A1 | 7/2015 | Winters et al. | |
| 2015/0227888 A1 | 8/2015 | Levanon et al. | |
| 2015/0227890 A1 | 8/2015 | Bednarek et al. | |
| 2015/0294265 A1 | 10/2015 | Monteverde | |
| 2015/0294266 A1 | 10/2015 | Siragusa | |
| 2015/0294292 A1 | 10/2015 | Michishita et al. | |
| 2016/0063438 A1 | 3/2016 | Shaken et al. | |
| 2016/0063583 A1 | 3/2016 | Nuthulapati et al. | |
| 2016/0071050 A1 | 3/2016 | Kaye | |
| 2016/0125842 A1 | 5/2016 | Weinberg et al. | |
| 2016/0148287 A1* | 5/2016 | Bellavance | G06Q 30/0641 705/15 |
| 2016/0148302 A1 | 5/2016 | Carr et al. | |
| 2016/0180287 A1 | 6/2016 | Chan et al. | |
| 2016/0292723 A1 | 10/2016 | Li et al. | |
| 2016/0300184 A1 | 10/2016 | Zamer et al. | |
| 2016/0300185 A1 | 10/2016 | Zamer et al. | |
| 2016/0350837 A1 | 12/2016 | Williams et al. | |
| 2017/0098264 A1* | 4/2017 | Priebatsch | G06Q 20/3224 |
| 2017/0270468 A1 | 9/2017 | Natarajan et al. | |
| 2018/0089668 A1* | 3/2018 | Wong | G06Q 30/0613 |
| 2018/0240181 A1 | 8/2018 | Lopez et al. | |
| 2018/0260883 A1 | 9/2018 | Iacono et al. | |
| 2019/0378202 A1* | 12/2019 | Belke | G06Q 30/06 |

OTHER PUBLICATIONS

Broussard, M., "Square Launches iOS App for Food Delivery Service Caviar," published Dec. 4, 2014, Retrieved from the Internet URL: https://www.macrumors.com/2014/12/04/square-caviar-app/, on Nov. 1, 2017, pp. 1-2.

Carson, B., "Uber's GrubHub Killer is finally in the US—here's the inside story on its big bet on food," Business Insider, dated Mar. 2, 2016, Retrieved from the Internet URL: http://www.businessinsider.com/why-uber-launched-uber-eats-2016-3, on Nov. 1, 2017, pp. 1-2.

Hebbard, D.B., "Chefs Feed: from strictly B2B to a unique consumer restaurant app," published Feb. 10, 2015, Retrieved from the Internet URL: http://www.talkingnewmedia.com/2015/02/10/chefs-feed-strictly-b2b-unique-consumer-product/, on Nov. 1, 2017, pp. 1-2.

Wisnewski, B., et al., "Getting Started with IBM API Connect: Concepts and Architecture Guide," International Technical Support Organization International Business Machines Corporation, dated Sep. 8, 2016, pp. 1-72.

Zamfir, I., "Filter Results," published Nov. 20, 2012, Retrieved from the Internet URL: https://dribbble.com/shots/822670-Filter-Results, on Nov. 1, 2017.

Non-Final Office Action dated Oct. 3, 2016, for U.S. Appl. No. 15/072,153, of Daire, K., et al., filed Mar. 16, 2016.

Non-Final Office Action dated Feb. 9, 2017, for U.S. Appl. No. 14/587,866, of Kumar, A.R., et al., filed Dec. 31, 2014.

Non-Final Office Action dated Mar. 9, 2017, for U.S. Appl. No. 15/390,958, of Gerard, R., et al., filed Dec. 27, 2016.

Final Office Action dated Mar. 21, 2017, for U.S. Appl. No. 15/072,153, of Daire, K., et al., filed Mar. 16, 2016.

Non-Final Office Action dated Apr. 6, 2017, for U.S. Appl. No. 15/283,092, of Iacono, J.F., et al., filed Sep. 30, 2016.

Notice of Allowance dated Jul. 6, 2017 for U.S. Appl. No. 15/072,153, of Daire, K., et al., filed Mar. 16, 2016.

Final Office Action dated Jul. 7, 2017, for U.S. Appl. No. 15/390,958, of Gerard, R., et al., filed Dec. 27, 2016.

Final Office Action dated Aug. 8, 2017, for U.S. Appl. No. 14/587,866, of Kumar, A.R., et al., filed Dec. 31, 2014.

Non-Final Office Action dated Nov. 7, 2017, for Design U.S. Appl. No. 29/559,618, of Lin, A., et al., filed Mar. 30, 2016.

Notice of Allowance dated Nov. 13, 2017, for U.S. Appl. No. 15/390,958, of Gerard, R., et al., filed Dec. 27, 2016.

Notice of Allowance dated Nov. 22, 2017, for U.S. Appl. No. 15/283,092, of Iacono, J.F., et al., filed Sep. 30, 2016.

Non-Final Office Action dated Jan. 10, 2018, for U.S. Appl. No. 14/587,866, of Kumar, A.R., et al., filed Dec. 31, 2014.

Supplemental Notice of Allowance dated Mar. 2, 2018, for U.S. Appl. No. 15/283,092, of Iacono, J.F., et al., filed Sep. 30, 2016.

Notice of Allowance dated Mar. 13, 2018, for Design U.S. Appl. No. 29/559,618, of Lin, A., et al., filed Mar. 30, 2016.

International Search Report and Written Opinion for International Application No. PCT/US2017/053976, dated Dec. 5, 2017.

Final Office Action dated Sep. 6, 2018, for U.S. Appl. No. 14/587,866, of Kumar, R., A., et al., filed Dec. 31, 2014.

Non-Final Office Action dated Sep. 7, 2018, for U.S. Appl. No. 15/078,879, of Varma, K., A., et al., filed Mar. 23, 2016.

Brodbeck, L., "Uber Goes Gourmet," Benzinga Newswires, Southfield, retreived from https://search.proquest.com/printviewfile?accountid=14753, Jan. 21, 2016, p. 2.

(56) References Cited

OTHER PUBLICATIONS

Ratti, C., et al., "Mobile landscapes: Using Location Data from Cell Phones for Urban Analysis," Environment and Planning B: Planning and Design, vol. 33, Issue 5, pp. 1-31 (Oct. 1, 2006).
Advisory Action dated Dec. 27, 2018, for U.S. Appl. No. 14/587,866 of Kumar, A.R., et al., filed Dec. 31, 2014.
Notice of Allowance dated Mar. 4, 2019, for U.S. Appl. No. 14/587,866 of Kumar, A.R., et al., filed Dec. 31, 2014.
Final Office Action dated Mar. 7, 2019, for U.S. Appl. No. 15/078,879, of Varma, A.K., et al., filed Mar. 23, 2016.
Advisory Action dated May 31, 2019, for U.S. Appl. No. 15/078,879, of Varma, A.K., et al., filed Mar. 23, 2016.
Non-Final Office Action dated Jun. 14, 2019, for U.S. Appl. No. 15/390,995, of Gerard, R., et al., filed Dec. 27, 2016.

\* cited by examiner

LOCATION-BASED TRANSACTION COMPLETION

BACKGROUND

Traditionally, customers of a restaurant may order items at the restaurant for dining in the restaurant. Alternatively, customers may order at a restaurant for takeout, e.g., ordering items at the restaurant and taking the ordered items out of the restaurant to another location for consumption. As another alternative, customers may order from the restaurant remotely, e.g., by telephone or online, and may pick up the ordered items for takeout, or in some cases, may dine-in. As still another alternative, customers may order remotely to receive delivery of an item from the restaurant, such as by having a courier deliver the ordered item to a delivery location specified by the customer. Often, these options may be performed disparately by the customers, e.g., using different ordering and payment techniques.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
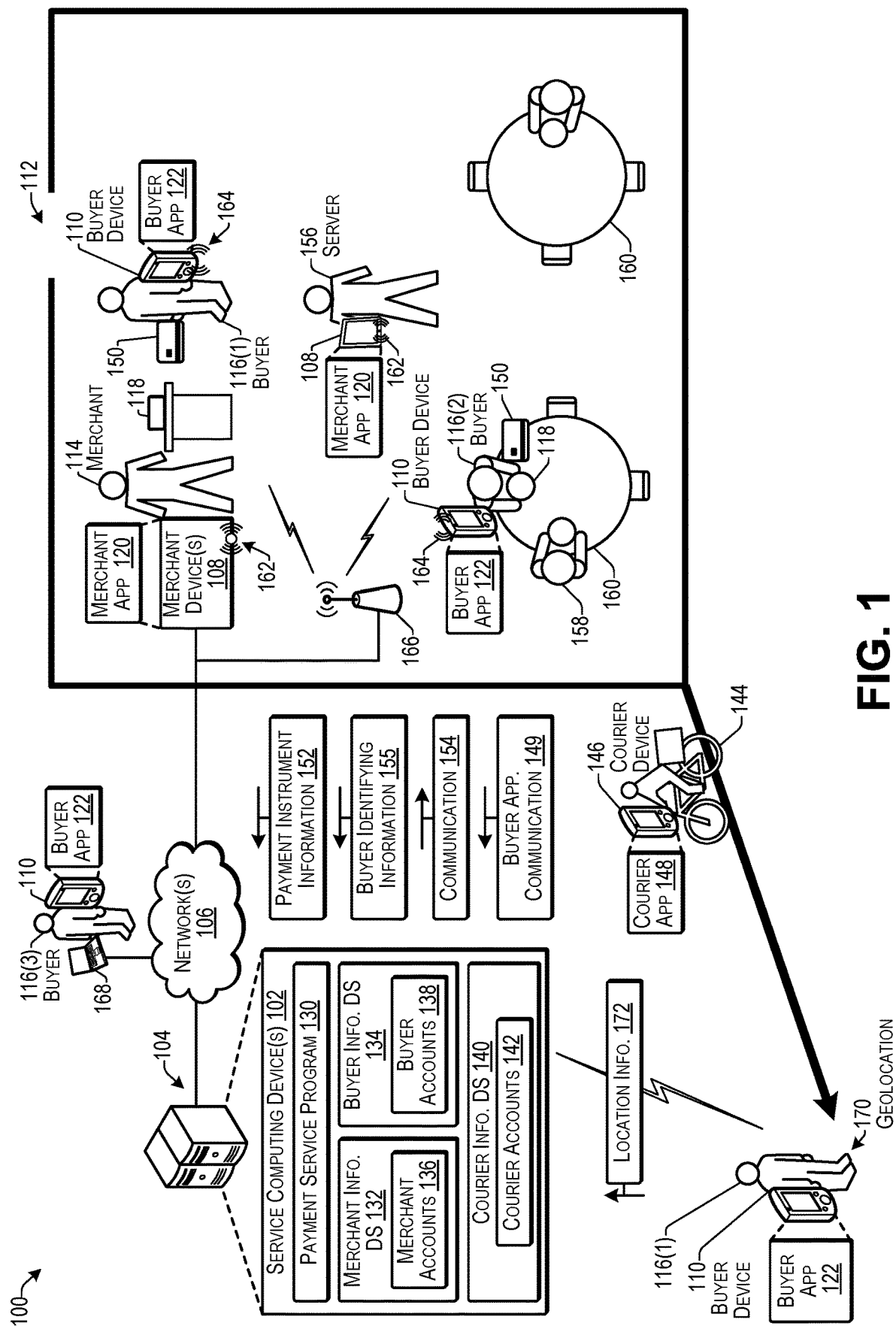
FIG. 1 illustrates an example distributed system for escalating a transaction to a buyer application for payment and/or fulfilment selection according to some implementations.

Some implementations herein include techniques and arrangements for enabling buyers (customers) to order and/or pay for items using a buyer application executing on a buyer device, such as a mobile computing device. For instance, the buyer application may be configured to communicate with a service computing device of a service provider. In some examples, the buyer application may include functionality for enabling the buyer to order and pay for food items via a graphical user interface (GUI) presented by the buyer application on the buyer device. Furthermore, in implementations herein, the buyer application may be used to pay for a transaction and/or change a fulfilment option for a transaction after the buyer has already placed an order or otherwise initiated the transaction conventionally.

The service computing device may communicate with a merchant application executing on a merchant device associated with a merchant. For instance, the merchant application may configure the merchant device as a point of sale (POS) device and the service computing device may process payments for the merchant through communication with the merchant application. In some examples, the buyer application and the merchant application may be able to communicate with each other directly, such as when within a distance to enable short-range radio communications (e.g., BLUETOOTH®, Wi-Fi, etc.). In other examples, the buyer application and the merchant application may communicate with the service computing device, which sends communications to the buyer application and the merchant application based on communications received from the buyer application and the merchant application.

As one example, the service computing device may receive, from the merchant application, an indication that a buyer has initiated a transaction with the merchant for obtaining an item. For example, suppose that the buyer has placed an order for the item in person, over the telephone, or online (e.g., though a merchant website), and has tendered a payment instrument, such as a credit card, debit card, charge card, gift card, mobile payment information, or the like, as payment for the order. Based on receiving payment instrument information from the merchant application, the service computing device is able to associate the current transaction with an existing buyer account and an associated buyer application installed on an associated buyer device.

Based on associating the payment instrument with the buyer account, the service computing device (or in some cases, the merchant application) may send a communication to the buyer device, such as to the buyer application on the buyer device, or through an SMS text message, instant message, email, etc., to determine whether the buyer would like to complete the transaction by paying for the transaction using the buyer application and/or whether the buyer would like to change a fulfilment mode for the transaction, such as changing from dine-in to takeout, delivery, and/or changing from a prepared meal to a meal-kit. Further, techniques other than payment card information may be used to determine the buyer account, such as a phone number of the buyer, an email address of the buyer, or through receipt by the merchant application of other buyer identifying information.

In response to the offer from the service computing device, suppose that the buyer accesses the buyer application on the buyer device and decides to make payment through the buyer application and/or change a fulfilment option for the order. For instance, suppose that the buyer decides to make payment through the buyer application and have the order delivered to a specified location. In response, the service application may send, to a courier application executing on a courier device associated with a courier, an instruction to pick up the item from the merchant and deliver the item to the delivery location specified by the buyer through the buyer application. Thus, when the item is ready, the courier may deliver the item to the specified delivery location.

Alternatively, as another example, suppose that the buyer accesses the buyer application on the buyer device and decides to specify that the item be delivered to a geolocation of the buyer device or to a specified delivery location when the order is ready. For instance, when the order is ready, the service computing device may receive a communication from one of the merchant application or the courier application indicating that the item is ready for delivery. The service computing device may send a communication to the buyer application to obtain a current geolocation of the buyer device. In some examples, the buyer application may determine the current location of the buyer based on global positioning system (GPS) information received from a GPS receiver on the buyer device or from other location information received from the buyer device.

The service computing device may receive, from the buyer application, the geolocation of the buyer device. The service computing device may send, to the courier device, the geolocation of the buyer device and an instruction to deliver the menu item to the buyer at the geolocation. In addition, the service computing device may send, to the buyer device, a communication to the buyer application to confirm to the buyer the geolocation to which the item will be delivered. Alternatively, in the examples in which the buyer specifies a particular delivery location, the service computing device might not obtain geolocation information from the buyer device.

In some examples, the merchant application may send item information and price information for the order to the service computing device. The service computing device may determine bill information based on the price information and/or item information, and send the bill information to the buyer device. The buyer application may present the bill information in a GUI on a display of the buyer device. The buyer can utilize the GUI on the buyer device to review the bill, add a gratuity if applicable, and instruct the service computing device to provide payment to the merchant. In response, the service computing device may charge the account of the buyer for the payment, credit an account of the merchant based on the payment, and may communicate confirmation of payment to the merchant device.

In some examples, in addition to being able to pay the bill with the buyer application, the buyer can use the buyer device to initiate a transaction by placing an order with the merchant for dining in the merchant restaurant. For instance, in response to receiving a request to place an order and an indication of a time at which the order is desired to be ready, the service computing device may send user interface information to cause the buyer application to present merchant item information on the buyer device. The buyer may select one or more items from the menu, and the selection may be forwarded by the service computing device to the merchant device along with an indication of a desired time for the buyer to dine-in at the restaurant. The merchant application or the merchant may determine whether a table is available for the indicated number of people, and if so, the merchant application provides a notification to an item preparer to prepare the requested item by the requested time and sends a communication to the service computing device indicating that the order has been accepted and a table reserved for the buyer. The buyer may use the buyer application to pay for the order beforehand, during, or after dining is complete. For example, any items added by the buyer during the meal may be added to the bill information by the merchant application communicating with the service computing device, and may be presented by the buyer application when the buyer is ready to pay the bill.

In the case that the merchant does not have a table available at the time requested by the buyer, the merchant may propose an alternative time at which a table would be available, may propose that the buyer take the food to go, and/or may propose that the buyer receive the food delivered to the buyer's location by a courier. In such a situation, the buyer application may present a GUI to enable the buyer to select one of the merchant's alternative proposals or, alternatively, cancel the order.

Some implementations herein include enabling the buyer to use the buyer application to pay for a transaction after the transaction order has been placed conventionally by the buyer at a POS terminal of the merchant. For example, the buyer could have instead used the buyer application from the beginning for placing the order from the merchant, such as for dine-in, takeout, or delivery, but may have forgotten to use the buyer application or not known that the buyer application was available for this merchant or in this situation. Accordingly, the service computing device may receive information from the merchant application indicating that the buyer has placed an order, and may communicate with the buyer, e.g., via the buyer application or other communication techniques authorized by the buyer, to provide the buyer with an opportunity to pay for the order or change the fulfilment mode of the order using the buyer application. Using the buyer application in this manner can enable the buyer to add the order to a transaction history associated with the buyer's account and pay with a payment instrument already associated with the buyer's account.

Furthermore, the buyer may be able to use the buyer application to change a fulfilment mode of the order after the order has been placed. As an example, suppose that the buyer initially had planned to wait for the order to be prepared and take the order home. After placing the order, suppose that the buyer receives a text from a friend who is currently down the street watching a performance in the park. The buyer can use the buyer application to change the order for delivery to the buyer at the park, such as to a geolocation of the buyer at the park. Accordingly, the buyer can leave the merchant location to go meet the friend and wait for the order to be delivered to the buyer at the park. The service computing device receives the buyer's selection of delivery mode via the buyer GUI, and sends a communication to a courier device associated with a courier with instructions to deliver the order to the geolocation of the buyer. The service computing device may receive continual updates on the geolocation of the buyer from the buyer application, and may send this geolocation information to the courier device until the courier has located the buyer and delivered the order.

In some examples, a buyer who does not think about using the buyer application and orders conventionally at the merchant POS terminal can have the order escalated to the full buyer application experience during or post-order. This escalation may be contingent on the service computing device being able to identify the buyer, and may be further contingent on both the buyer and the merchant already having the buyer application and the merchant application, respectively, installed on their respective devices.

Furthermore, examples herein are not limited to escalation to completing the transaction with the application following ordering at the merchant's physical POS terminal in the merchant location. For example, the techniques herein may also be applied to an online sale, such as on an ecommerce site. For example, a buyer may initially use a website of a restaurant to place an online food order for dine-in, takeout, or delivery of a prepared item, or for takeout or delivery (or in some cases dine-in) of a meal kit. After the buyer has paid for the order, and thereby provided identifying information, the service computing device may determine the identity of the buyer, associate the current order with a buyer account of the buyer, and send the buyer a communication via the buyer application or other authorized communication technique to enable the buyer to access the buyer application and escalate the order on the buyer's device. For example, the escalation of the order to the buyer application may enable features such as providing alternative fulfillment options, alternative payment options, the ability to submit a rating or review of the order, the ability to access a social feed provided by the application, the ability to receive reward points for the order, and so forth. Further, the merchant application may access the order history of the buyer to determine past orders of the buyer, such as for determining which items the buyer likes, how the buyer likes the items prepared, and the like.

As one example, suppose that the merchant website provides delivery as the only fulfilment option when a buyer places an order for an item through the website. On the other hand, when the buyer accesses the buyer application to manage the order, the buyer may be presented with alternative fulfilment options, such as dine-in, takeout, a meal kit, or the like, which the buyer might prefer if the merchant location is nearby, such as to save on a delivery fee. Additionally, based on the access to the buyer's order history, the buyer application may present the buyer with the option to repeat a prior order.

Furthermore, some examples herein may employ prepayment escalation in addition to post-payment escalation. For example, as soon as the point of sale (in-person, online, or otherwise) has enough information to identify the buyer, the merchant application may provide this information to the service computing device, and the service computing device may send a communication to the buyer to inform the buyer that the order may be completed via the buyer application. For example, at an online point of sale, the customer may enter his email address prior to providing his payment information. The email address may be sufficient to identify the buyer to enable the service computing device to send a communication to the buyer to escalate the order to the buyer application.

The buyer may choose to access the application, and the service computing device may provide the current order information, current merchant menu information, and the like, to the buyer application to cause the buyer application to present this information in a GUI on the buyer device so that the order is seamlessly transitioned to the buyer application. The buyer can use the existing buyer application payment means (e.g., a payment card or other payment account on file with the service computing device) and may select a fulfillment mode provided via the buyer application, without having to enter payment information at the original point of sale.

Furthermore, implementations herein are not necessarily limited to ordering food from restaurants or other items from brick-and-mortar stores. To contrary, the examples herein enable a seamless, timely escalation of a transaction to being handled by a buyer application on a buyer device when enough information about the buyer is available to do so. Thus, an escalation may occur from a first point of sale (e.g., in-person, online, or the like) to a rich fulfillment and/or payment application able to provide a GUI on a buyer device of the buyer to give the buyer choices that the buyer may not have had or may have chosen not to exercise when using the original point of sale.

Additionally, in some cases, the buyer application on the buyer device may communicate directly with the merchant application on the POS device. For instance, the merchant application or the buyer application may be configured to issue a notification or other direct communication to the other one of the buyer application or the merchant application based on interaction with at least one of location services (e.g., GPS, geofence), a Wi-Fi network, an ultrasound signal, a short-range radio signal, or the like. As one example, an ultrasound communication may establish the location of the buyer device and/or may establish the identity of the buyer, and may establish a token to link to an order placed by the buyer for escalating the transaction order to the buyer application of the correct buyer. After the merchant application has determined that a buyer device is nearby and/or the buyer application has determined that the buyer is in a location of a participating merchant, the merchant application and the buyer application may synchronize with each other or otherwise establish a channel of communication, such as via ultrasound signals, short-range radio signals (e.g., BLUETOOTH® or Wi-Fi), or through communication with the service computing device.

Following establishment of communication, the buyer application may receive menu information, pricing information, and the like, from the merchant application, and may present this information in a GUI on the buyer device. The buyer may order and pay for the transaction using the buyer application. In some examples, such as in the case that the buyer has already been seated in a restaurant, the merchant application and/or the buyer application may determine a location of the buyer in the restaurant, such as at a specific table, or may otherwise associate the buyer with a specific order. Additionally, in other situations, the merchant application may indicate a shortest line to the buyer, may indicate a potential wait time in line, may determine the closest item for purchase in a retail location, or the like.

As one example, suppose that the buyer enters a restaurant with a friend, is seated at a table, and orders a meal. The server may enter the order of the buyer and the buyer's friends into a tablet or other merchant device executing the merchant application. The server may be presented with a notification from the merchant application that the buyer is recognized as being at the table, such as based on a communication from the service computing device indicating that the buyer has been associated with a previously established buyer account. The server may set a timer for the buyer to pay the bill and/or may manually push a notification for the bill to the buyer device. As the buyer and friend are finishing their meals, the buyer may be presented with the notification by the buyer application. The notification may cause the buyer application to present a GUI that gives the buyer the option to use the buyer application to pay the buyer's bill. Further, in some examples, the buyer may be presented with the option to also pay the friend's bill, select specific items for payment, split the bill, or the like. The buyer application may further present the buyer with available payment options, such as using a payment card on file, a mobile wallet payment, a manual payment, etc.

As another example, the merchant application at a retail location may establish, such as through ultrasound or short-range radio, communication with buyer applications of buyers who are passing by the retail location. The merchant application may push a communication to the buyer application to notify the buyer application of sales, special deal of the day, and so forth. Thus, the merchant application may provide the merchant with an opportunity to push notify daily deals or other retail promotions while the buyers are present and in proximity to the retail location of the merchant.

In the examples herein, a buyer may order in-person, online, e.g., via a browser, through the buyer application, or through various other techniques, such as telephone, text message, or the like, and may escalate ordering from other techniques to ordering via the buyer application. In some cases, the buyer may choose between and/or switch between prepared meals and meal kits, such as by using the buyer application. Further, the buyer may switch between various fulfilment options, namely delivery, takeout, or dine-in. Accordingly, meal-kits and/or prepared meals can be fulfilled via dine-in; meal-kits and/or prepared meals can be fulfilled via takeout; and/or meal-kits and/or prepared meals can be fulfilled via delivery.

For discussion purposes, some example implementations are described in the environment of a service computing device that recognizes a buyer participating in a transaction with a merchant and escalates the buyer's options for ordering and/or paying for the transaction. However, implementations herein are not limited to the particular examples described, and may be extended to other types of transactions, other types of payments, other environments, other system architectures, and so forth, as will be apparent to those of skill in the art in light of the disclosure herein.

FIG. 1 illustrates an example distributed system for escalating a transaction to a buyer application for payment and/or fulfilment selection according to some implementations. In the illustrated example, one or more service computing devices 102 associated with a service provider 104 are able to communicate over one or more networks 106 with one or more merchant devices 108 and one or more buyer devices 110. In some examples, the service provider 104 may be any business, enterprise, or other entity that offers, sells, supplies, provides, or otherwise enables the services described herein.

The merchant device 108 may be associated with merchant location 112 of a merchant 114, such as at a particular geographic location. In some examples, the merchant location 112 may be a restaurant, retail shop, or other business that enables buyers 116 to order and receive items 118. In some cases, the items 118 may be menu items that the buyer 116 may order for dining in, takeout, or delivery. In other cases, the items offered by the merchant 114 may be retail items or other goods or services. In some examples, in addition to offering prepared menu items, the merchant 114 may also offer meal kits, i.e., food that a buyer may take out of the merchant location 112 or receive by delivery, and prepare himself or herself at another location. Alternatively, in some examples, the meal kit may be prepared by the buyer at the restaurant. Accordingly, examples of items 118 according to some implementations may include menu items, services, retail goods, or the like, although implementations herein are not limited to any particular types of items 118.

The merchant device 108 may be a computing device that includes an instance of a merchant application 120 that executes on the respective merchant device 108. In some examples, the merchant application 120 may provide POS functionality to the merchant device 108 to enable the merchant 114 to accept payments at a POS location, e.g., at the merchant location 112. For example, the merchant 114 may use the merchant device 108 to accept payments at the merchant location 112 from a plurality of the buyers 116 using a variety of payment instruments, such as payment cards, cash, check, etc., in addition to the electronic payments discussed herein. However, in other examples, the merchant device 108 may be a computing device that is separate from a POS device at the merchant location 112.

As described herein, the merchant 114 may include any business or other entity engaged in the offering of items for acquisition by buyers 116 in exchange for compensation received from the buyers 116. Actions attributed to a merchant 114 herein may include actions performed by employees or other agents of the merchant 114 and, thus, no distinction is made between merchants and their employees unless specifically discussed. In addition, as described herein, the buyer 116 may include any entity that acquires items from a merchant 114, such as by purchasing, renting, leasing, borrowing, licensing, or the like. Buyers 116 may include customers or potential customers of a particular merchant 114.

Thus, a merchant 114 and a buyer 116 may interact with each other to conduct a transaction in which the buyer 116 acquires one or more items from the merchant 114 and, in return, the buyer 116 provides payment to the merchant 114. For instance, the buyer 116 may acquire the items, e.g., through placement of an order, and the merchant 114 may present a bill to the buyer 116 as an accounting of the amount owed. Accordingly, as described herein, a bill or bill information may include any tab, check, statement of charges, invoice, or other accounting of an amount owed by a buyer 116 to a merchant 114 for one or more items acquired from the merchant 114. Furthermore, while a single merchant 114 and several buyers 116 are illustrated in this example, there may be a large number of merchants and a large number of buyers who participate in the systems and techniques described herein.

The buyer 116 may have or may otherwise be associated with the buyer device 110 that executes an instance of a buyer application 122. For example, some buyers 116 may carry buyer devices 110, such as smart phones, tablet computers, wearable computing devices, or the like, as further enumerated elsewhere herein, and some of these buyer devices 110 may have installed thereon the buyer application 122. The buyer application 122 may include electronic payment capability, which enables the buyer 116 to make a payment to the merchant 114 using the buyer application 122, rather than paying with a physical payment card, cash, bill, or other payment instrument. The buyer application 122 may further present a GUI to enable the buyer 116 to place an order for an item 118 in addition to paying for the item 118. The buyer application 122 may also be able to receive and/or interpret location information to enable determination of a current location of the buyer device 110.

Additionally, in some examples, the buyer device 110 may include a GPS receiver, and the buyer application 122 may provide the current GPS location of the buyer device 110 to the service computing device 102 to indicate the geographical location of the buyer device 110. As one example, the service computing device 102 may use the geographical location of the buyer device 110 to determine the merchant location 112 at which the buyer 116 is located.

The service computing device 102 may include a payment service program 130 that may receive transaction information for processing payments made through the merchant application 120 and/or the buyer application 122. For example, the payment service program 130 may receive transaction information, such as an overall amount of each transaction, a description of items purchased, an amount charged for each item, an amount charged for tax, an amount of gratuity to be added, and so forth. Thus, in some instances, the merchant device 108 may function as a POS device that can receive payments by a variety of payment instruments, including payment cards, checks and cash, as well as enabling electronic payments to be made through the buyer application 122.

The payment service program 130 may communicate with the merchant application 120 to enable the merchant device 108 to receive certain types of payments such as electronic payments or payment card payments. In the case that a buyer 116 is using the buyer application 122 to pay electronically, any of several techniques may be employed for making electronic payments. As one example, the buyer 116 may establish an account with the service provider 104 through the buyer application 122. For instance, the buyer 116 may link a credit card or other buyer account to the buyer application 122. Subsequently, the buyer 116 may interact with merchants 114 who participate in the payment service offered by the service provider 104, and may use the buyer application 122 to pay for items. When the buyer 116 authorizes a payment for a transaction using the buyer application 122, the service computing device 102 may charge the linked buyer account and may credit a merchant account of the corresponding merchant 114.

As an alternative, when a buyer 116 is paying a bill with a physical payment card, the payment service program 130 may receive the transaction information from the merchant device 108. For example, the received transaction information may include the bill amount and the payment card information. The payment service program 130 may verify that the particular payment card can be used to pay for the transaction, such as by contacting a card clearinghouse computing device or other bank computing device (not shown in FIG. 1). In some examples, the payment service program 130 may redirect payment card information for transactions to an appropriate card clearinghouse computing device, while in other examples, the merchant device 108 may communicate directly with an appropriate card clearinghouse computing device for approving or denying a transaction using a particular payment card for a particular transaction.

The payment service program 130 may use and/or maintain a merchant information data structure (DS) 132 and a buyer information data structure (DS) 134. To accept payments for POS transactions, the merchant 114 may create a merchant account 136 with the service provider 104 by providing information describing the merchant 114 including, for example, a merchant name, contact information, e.g., telephone numbers, the merchant's street address, and one or more financial accounts to which funds collected from buyers will be deposited. Further, the service provider 104 may also associate with the merchant account 136 additional information about the merchant 114, such as a record of each transaction conducted by the merchant 114. In addition, the merchant account 136 may include item information, such as a listing of items offered by the merchant and prices associated with each item offered by the merchant.

Further, before conducting an electronic payment transaction, the buyer 116 creates a buyer account 138 with the service provider 104. The buyer 116 can create the buyer account 138, for example, by interacting with the buyer application 122. When enabling electronic payments with the service provider 104, the buyer 116 may provide an image including the face of the buyer, data describing a financial account of the buyer 116, e.g., a credit card number, expiration date, and a billing address. Further, the buyer account 138 may include demographic information about the buyer 116 and a record of transactions conducted by the buyer 116.

The payment service program 130 may use and/or maintain a courier information data structure (DS) 140 that may include courier accounts 142. For example, when a courier 144 signs up to act as a courier for the service provider 104, the courier may provide various courier information and account information for receiving payment from the service provider 104. Further, the courier accounts 142 may include information related to each delivery job performed by the respective courier to which the respective courier account 142 relates. Each courier 144 may have a courier device 146 that may include a courier application 148 installed thereon. As discussed additionally below, the courier application 148 may communicate with the payment service program 130 for receiving delivery job information from the payment service program 130 and for presenting information related to delivery jobs in a GUI on the courier device 146. In addition, the courier application 148 may periodically provide courier location information to the payment service program 130 to provide an indication of a current location of each courier device 146.

The buyer accounts 138 and/or merchant accounts 136 and/or courier accounts 142 described herein may be created and maintained using any suitable types of data structures, and using any suitable data storage or database techniques. In some examples, the account information may be maintained in a relational database in which pieces of information for individual buyer accounts, merchant accounts, and courier accounts may be stored distinctly from one another, but are related to or otherwise associated with particular accounts in the relational database. For instance, a particular buyer account 138 may be obtained by generating a view of a portion the data related in the database to the particular buyer account 138, or by otherwise extracting the data from the database. Alternatively, of course, other types of storage techniques may be used for generating and maintaining the merchant accounts 136, the buyer accounts 138, and the courier accounts 142.

In some examples, the buyer application 122 and the merchant application 120 may be able to communicate with each other directly, such as when within a distance to enable short-range radio communications (e.g., BLUETOOTH®, Wi-Fi, etc.), ultrasound communications, or the like. In other examples, the buyer application 122 and the merchant application 120 may communicate with the payment service program 130 on the service computing device 102, which sends communications to the buyer application 122 and the merchant application 120 based on communications received from the buyer application 122 and the merchant application 120.

As one example, suppose that a first buyer 116(1) has initiated a transaction with the merchant 114 on the merchant device 108 for obtaining an item 118. The payment service program 130 may receive, from the merchant application 120 executing on the merchant device 108, an indication that the first buyer 116(1) has initiated the transaction. For instance, suppose that the first buyer 116(1) has placed an order for the item 118 in person, over the telephone, or online (e.g., through a merchant website), and has tendered a payment instrument 150, such as a credit card, debit card, charge card, gift card, mobile payment information, or the like, as payment for the order. Based on receiving payment instrument information 152 from the merchant application 120, the payment service program 130 is able to associate the current transaction with an existing buyer account 138 and an associated buyer application 122 installed on an associated buyer device 110 of the first buyer 116(1). As one example, the buyer 116(1) may have previously used the payment instrument 150 in association with the buyer account 138, such as when signing up for using the buyer application 122. As another example, the payment service program 130 may determine from the payment instrument information 152 that the payment instrument 150 is associated with the particular first buyer 116(1), such as based on a confidence level or the like.

In response to associating the payment instrument 150 with the respective buyer account 138 of the first buyer 116(1), the payment service program 130 may send a communication 154 to the buyer device 110 of the first buyer 116(1), such as to the buyer application 122 on the buyer device 110, or through an SMS text message, instant message, email, etc., to determine whether the first buyer 116(1) would like to complete the transaction by paying for the transaction using the buyer application 122 and/or whether the first buyer 116(1) would like to change a fulfilment mode for the transaction, such as changing from dine-in to takeout, delivery, or a meal-kit. Further, techniques other than payment instrument information may be used to determine the respective buyer account 138, such as a phone number of the first buyer 116(1), an email address of the first buyer 116(1), or through receipt by the merchant application 120 of other buyer identifying information. Additionally, in some cases, the merchant application 120 may send the communication 154, such as via short-range radio, or the like, as enumerated elsewhere herein.

In response to the communication 154, suppose that the first buyer 116(1) accesses the buyer application 122 on the buyer device and decides to make payment for the order of the item 118 through the buyer application 122. The merchant application 120 may have already sent item information and/or price information for the order to the service computing device 102 along with the payment instrument information or other information identifying the first buyer 116(1). The payment service program 130 on the service computing device 102 may determine bill information based on the price information and/or item information, and may send the bill information to the buyer device 110 of the first buyer 116(1). The buyer application 122 may present the bill information in a GUI on a display of the buyer device 110 of the first buyer 116(1). The first buyer 116(1) can utilize the GUI on the buyer device 122 to review the bill, add a gratuity if applicable, and send a buyer application communication 149 to instruct the payment service program 130 to provide payment to the merchant 114 for the order. In response, the payment service program 130 may charge the account of the first buyer 116(1) for the payment, credit an account of the merchant 114 based on the payment, and may communicate confirmation of payment to the merchant device 108. The merchant application 120 may present a GUI that informs the merchant 114 that payment has been received for the order.

Accordingly, a buyer who does not think about using the buyer application 122 and orders conventionally from the merchant 114, using the merchant device 108 as a POS terminal, can have the order escalated to the full buyer application experience either during placement of the order or after the order has been placed. This escalation may be contingent on the payment service program 130 being able to identify the first buyer 116(1), and may be further contingent on both the first buyer 116(1) and the merchant 114 already having the buyer application 122 and the merchant application 120, respectively, installed on their respective buyer device 110 and merchant device 108.

As another example, suppose that a second buyer 116(2) wants to use the buyer application 122 to pay for a transaction after the order has been placed conventionally by the second buyer 116(2) at a POS terminal of the merchant 114 or through ordering from a server 156. For example, the second buyer 116(2) could have used the buyer application 122 from the beginning for placing the order from the merchant 114, such as for dine-in, takeout, delivery, or meal kit, but may have forgotten to use the buyer application 122 or may not have known that the buyer application 122 was available to be used for this merchant 114 or in this situation. Accordingly, the payment service program 130 may receive information from the merchant application 120 indicating that the second buyer 116(2) has placed an order, and may communicate with the second buyer 116(2), e.g., via the buyer application 122 or other communication techniques authorized by the second buyer 116(2), to provide the second buyer 116(2) with an opportunity to pay for the order or change the fulfilment mode of the order using the buyer application 122. Using the buyer application 122 in this manner can enable the second buyer 116(2) to add the order to a transaction history associated with the second buyer's buyer account 138, and pay with a payment instrument already associated with the second buyer's buyer account 138.

As one example, suppose that the second buyer 116(2) enters the merchant location 112 with a friend 158 and is seated at a table 160. In some examples, the merchant application or the buyer application may be configured to issue a notification to the other one of the buyer application 122 or the merchant application 120 based on interaction with at least one of location services (e.g., GPS, geofence), a Wi-Fi network, an ultrasound signal, a short-range radio signal, or the like. As one example, the merchant application 120 may include an ultrasound module (not shown in FIG. 1) that causes the merchant device(s) 108 to periodically issue an ultrasound transmission, as indicated at 162. The buyer application 122 may include an ultrasound module (not shown in FIG. 1) that enables the buyer device 110 to receive and decode the ultrasound transmission from the merchant device 108. For example, the ultrasound transmission may indicate to the buyer application 122 that the buyer application can be used at the merchant location and may request buyer identifying information 155 from the buyer application 122. The buyer application may provide the buyer identifying information to the merchant device 108 via a responsive ultrasound transmission 164. The merchant device may decode the ultrasound transmission 164 and transmit the buyer identifying information 155 to the service computing device 102. Alternatively, in other examples, the buyer application 122 may transmit the buyer identifying information to the service computing device 102 in response to receiving the ultrasound transmission 162 from the merchant device 108.

In either event, the ultrasound communications 162 and 164 may be used to establish the location of the buyer device 110 of the second buyer 116(2) inside the merchant location 112, and may be used to establish a token to link to an order placed by the second buyer 116(2) for escalating the order to the buyer application 122 of the correct buyer. For instance, after the merchant application 120 has determined that a buyer device 110 executing the buyer application 122 is nearby and/or the buyer application 122 has determined that the second buyer 116(2) is in a merchant location 112 of a participating merchant 114, the merchant application 120 and the buyer application 122 may synchronize with each other or otherwise establish a channel of communication.

Following establishment of communication, the buyer application 120 may receive menu information, pricing information, and the like, from the merchant application 120 directly or via the payment service program 130, and may present this information in a GUI on the buyer device 110. The second buyer 116(2) may order and pay for the order using the buyer application 122. In some examples, such as in the case that the second buyer 116(2) has already been seated in a restaurant, the merchant application 120 and/or the buyer application 122 may determine a location of the buyer in the restaurant, such as at the specific table 160. Accordingly, in some cases, the second buyer 116(2) may use the buyer application to 122 to place an order before the server 156 arrives at the table 160. The merchant application 120 on the server's merchant device 108 may inform the server 156 of the order placed by the second buyer 116(2). In addition, the second buyer 116(2) may subsequently use the buyer application 122 to order additional items and/or pay the bill without requiring interaction with the server 156.

Furthermore, in other examples, rather than using ultrasound communications for the techniques discussed above, the merchant device 108 and buyer device 110 may use short-range radio communications, such a BLUETOOTH® or Wi-Fi. For instance, in the case of BLUETOOTH®, the merchant device and buyer device may communicate directly with each other, while in the case of Wi-Fi, the merchant device 108 and buyer device 110 may communicate directly or through a wireless access point 166. Additionally, in other situations, the merchant application 120 may use direct ultrasound or short-range radio communications to indicate a shortest line to the buyer 116, may indicate a potential wait time in line, may determine the closest item for purchase in a retail location, or the like.

As another example, suppose that the second buyer 116(2) and friend 158 are seated and order from the server 156 in a conventional manner. The server 156 may enter the order of the second buyer 116(2) and the buyer's friend into a tablet or other merchant device 108 executing the merchant application 120 (or in communication with a merchant device 108 executing the merchant application 120). Subsequently, suppose that the second buyer 116(2) tenders a payment instrument 150 or is otherwise identified as being associated with the order, such as through the ultrasound transmission 162, or the like. The server 156 may be presented with a notification from the merchant application 120 that the second buyer 116(2) is recognized as being associated with the order. The merchant device 108 or the payment service program 130 may send a communication 154 to the buyer device 110 of the second buyer 116(2) to inquire as to whether the second buyer 116(2) would like to complete payment for the order using the buyer application 122. For example, the communication 154 may cause the buyer application 122 on the buyer device 110 of the second buyer 116(2) to present a GUI that gives the second buyer 116(2) the option to use the buyer application 122 to pay the bill. Further, in some examples, the GUI may present the second buyer 116(2) with the option to also pay the friend's bill, select specific items for payment, split the bill, or the like. The buyer application 122 may further present the second buyer 116(2) with available payment options, such as payment card on file, mobile wallet payment, manual payment, etc.

Furthermore, examples herein are not limited to escalation to the buyer application 122 for completing a transaction with the application following ordering at the merchant's physical POS terminal in the merchant location 112. For example, the techniques herein may also be applied to an online sale, such as through use of an ecommerce site. For example, suppose that a third buyer 116(3) may initially uses a laptop 168 to access a website of the merchant 114 to place an online food order for dine-in, takeout, delivery, or for pick up or delivery of a meal kit. The third buyer 116(3) may tender payment for the order, or may otherwise provide buyer identifying information, such as through an email address, phone number, or the like. The merchant application 120 may receive this information and may pass it on to the payment service program 130. The payment service program 130 may determine that the third buyer 116(3) is associated with a previously established buyer account 138, and may send a communication 154, such as via the buyer application or other authorized communication technique, to invite the third buyer 116(3) to access the buyer application 122 and escalate the order on the buyer's device 110 to complete the transaction using the buyer application 122.

When the third buyer 116(3) accesses the buyer application 122, the buyer application 122 may receive, from the payment service program 130, the transaction information entered so far by the buyer 116(3). The buyer application 122 may present a GUI (not shown in FIG. 1) that provides the third buyer 116(3) with alternative fulfilment selection options for the transaction and virtual controls for completing payment for the transaction and selecting additional items for the transaction, as discussed additionally below, e.g., with respect to FIG. 2. For example, the escalation of the order to the buyer application 122 may enable features such as providing alternative fulfillment options, alternative payment options, the ability to submit a rating or review of the order, the ability to access a social feed provided by the buyer application 122, the ability to receive reward points for the order, and so forth. Further, the merchant application 120 or the buyer application 122 may access the order history of the buyer 116 to determine past orders of the buyer 116, such as for determining which items the buyer 116 likes, how the buyer likes the items prepared, and so forth.

As one example, suppose that the merchant website provides delivery as the only fulfilment option when a buyer 116 places an order for an item through the website. On the other hand, when the buyer 116 accesses the buyer application 122 to manage the order, the buyer 116 may be presented with alternative fulfilment selection options, such as dine-in, takeout, a meal kit, or the like, which the third buyer 116(3) might prefer if the merchant location 112 is nearby, such as to save on a delivery fee. Additionally, based on the access to the buyer's order history, the buyer application 122 may present the buyer 116 with the option to repeat a prior order without having to go through the process of navigating through the merchant website to select particular items.

As still another example, suppose that the third buyer 116(3) uses the laptop 168, with subsequent escalation to the buyer application 122, as discussed above, or instead uses the buyer application 122 on the buyer device 110 from the start, to place an order in advance with the merchant 114 for dining at the merchant location 112. For instance, in response to receiving a request to place an order and an indication of a time at which the order is desired to be ready from the buyer application 122, the payment service program 130 may send user interface information to cause the buyer application 122 to present merchant item information in a GUI on the buyer device 110. The buyer 116(3) may select one or more items from the menu, and the selection may be forwarded by the service computing device to the merchant device 108 along with an indication of a desired time for the buyer 116(3) to dine-in at the restaurant.

In response to the request from the buyer application 122, the merchant application 120 or the merchant 114 may determine whether a table 160 is available for the indicated number of people at the indicated time, and if so, the merchant application 120 (or the merchant 114) provides a notification to an item preparer to prepare the requested item by the requested time and sends a communication to the service computing device 102 indicating that the order has been accepted and a table with be reserved for the buyer 116. The buyer 116 may use the buyer application 122 to pay for the order before, during, or after dining is complete. For example, any items added by the buyer 116(3) during the meal may be added to the bill information by buyer application 122 and/or by the merchant application 120 communicating with the payment service program 130 on the service computing device 102, and may be presented by the buyer application 122 in the bill when the buyer 116 is ready to pay the bill.

On the other hand, in the case that the merchant 114 does not have a table available at the time requested by the buyer 116, the merchant 114 may propose an alternative time at which a table would be available, may propose that the buyer 116 takeout the food to go, and/or may propose that the buyer 116 receive the food delivered to the buyer's location by a courier 144. As another alternatively, the merchant 114 may provide the order as a meal kit in some cases. The buyer application 122 may present a GUI to enable the buyer 116 to select one of the merchant's alternative proposals or, alternatively, cancel the order.

Furthermore, some examples herein may employ prepayment escalation in addition to post-payment escalation. For example, as soon as the merchant application 108 on the merchant device (in-person, online, or otherwise) has enough information to identify the buyer 116, the merchant application 108 may provide this information to the service computing device 102, and the payment service program 130 on the service computing device 102 may send a communication 154 to the buyer 116 to inform the buyer that the order may be completed via the buyer application 122. For example, at an online point of sale, the buyer 116 may enter his or her email address prior to providing payment information. The email address may be sufficient to associate the buyer 116 with a particular buyer account 138 to enable the payment service program 130 to send the communication 154 to the buyer device 110 to escalate the order to the buyer application 122.

The buyer 116 may choose to access the application 122, and the payment service program 130 may provide the current order information, current merchant menu information, and the like, to the buyer application 122 to cause the buyer application 122 to present this information in a GUI on the buyer device 110 so that the order is seamlessly transitioned to the buyer application 122. The buyer 116 can use the existing buyer application payment instrument (e.g., a payment card or other payment account on file with the service computing device in the buyer account 138) and may select a fulfillment mode provided via the buyer application 122, without having to enter payment information at the original point of sale.

Furthermore, implementations herein are not necessarily limited to ordering food from restaurants or other items from brick-and-mortar stores. To contrary, the examples herein enable a seamless, timely escalation of a transaction to being handled by a buyer application 122 on a buyer device 110 when enough information about the buyer 116 is available to do so. Thus, an escalation may occur from a first point of sale (e.g., in-person, online, or the like) to a rich fulfillment and/or payment experience using the buyer application 122 to provide a GUI on a buyer device 110 of the buyer 116 to give the buyer choices that the buyer 116 may not have had or may have chosen not to exercise when using the original point of sale.

As another example, whether or not the first buyer decides to make payment through the application, suppose that the first buyer 116(1) decides to have the item 118 delivered to a specified delivery location or other geolocation 170. In response, the payment service program 130 may send, to the courier application 148 executing on the courier device 146 associated with a selected courier 144, an instruction to pick up the item 118 from the merchant 114 and deliver the item 118 to the delivery location specified by the buyer through the buyer application 122. Thus, when the item 118 is ready, the courier 144 may pick up and deliver the item 118 to the specified delivery location. The specified delivery location may be a specified address or may be a location of the buyer determined from GPS information or other location information 172 received from the buyer application 122.

In this example, suppose that the first buyer 116(1) accesses the buyer application 122 on the buyer device 110 and decides to specify that the item 118 be delivered to a geolocation of the buyer device 110 of the first buyer 116(1) when the order is ready. For instance, suppose that the first buyer 116(1) initially had planned to wait for the item 118 to be prepared and take the item 118 home or dine-in at the merchant location 112. After placing the order, suppose that the first buyer 116(1) receives a text from a friend who is currently down the street attending a music festival. Accordingly, the first buyer 116(1) may escalate to using the buyer application 122 and may interact with a GUI presented by the buyer application 122 to request a change in a previously selected fulfilment option. For instance, the first buyer 116(1) may immediately depart from the merchant location 112 and may request a change in fulfilment to have a courier 144 deliver the item 118 to the first buyer 116(1) at another geolocation 170, which may be a specified address or which may be based on determining a GPS location of the buyer device 110 of the first buyer 116(1).

In some examples, before presenting the buyer with the option to fulfil the order by courier, the payment service program 130 may first check to determine that there is one or more couriers within a sufficiently close travel time to the merchant location to allow time for a courier to arrive at the merchant location when the item 118 is ready for pickup. For example, when there is not a threshold quantity of couriers currently available in the vicinity of the merchant location 112, then the payment service program 130 may send a communication to the buyer application 122 to cause the buyer application 122 to indicate in the GUI that delivery is not currently available as a fulfilment option.

On the other hand, when there is at least one courier 144 available, the payment service program 130 may send a communication to the buyer application 122 to cause the buyer application 122 to include the courier delivery option in the GUI presented on the buyer device 110 of the first buyer 116(1). The first buyer 116(1) may use the GUI presented by the buyer application 122 to change the order from the previously selected fulfilment option to a delivery fulfilment option. Further, the buyer may specify that the delivery is to be to a geolocation of the buyer at the location of the music festival. Accordingly, the buyer can leave the merchant location without waiting for the item 118 to be prepared, go meet the friend at the music festival, and wait for the order to be delivered to the geolocation 170 of the first buyer 116(1).

The payment service program 130 receives the buyer's selection of delivery as the fulfilment selection made via the buyer GUI, and sends a communication to a courier device 146 associated with a courier 144 with instructions to deliver the item 118 to the geolocation of the buyer. The payment service program 130 may receive location information 172 as continual updates on the geolocation 170 of the first buyer 116(1) from the buyer application 122, and may send geolocation information to the courier application 148 on the courier device 146 until the courier 144 has located the first buyer 116(1) and delivered the order. For instance, when the item 118 has been prepared, the payment service program 130 may receive a communication from at least one of the merchant application 120 or the courier application 148 indicating that the item 118 is ready for delivery. The payment service program 130 may send a communication to the buyer application 122 to obtain a current geolocation 170 of the buyer device 110. In some examples, the buyer application 122 may determine the current location of the first buyer 116(1) based on global positioning system (GPS) information received from a GPS receiver on the buyer device or from other location information received from the buyer device 110 of the first buyer 116(1).

The payment service program 130 may receive, from the buyer application 122, the location information 172 indicating the geolocation 170 of the buyer device 110. The payment service program 130 may send, to the courier device 146, the geolocation 170 of the buyer device 110 and an instruction to deliver the item 118 to the first buyer 116(1) at the geolocation 170. In addition, the payment service program 130 may send, to the buyer device 110, a communication to the buyer application 122 to confirm to the first buyer 116(1) the geolocation 170 to which the item 118 will be delivered. Alternatively, in the examples in which the buyer specifies a particular delivery location, the service computing device might not obtain location information 172 from the buyer device.

The first buyer 116(1) may also receive, from the payment service program 130, courier location information indicating the current location of the courier 144. Thus, in some examples, the first buyer 116(1) may move toward the location of the courier 144 to meet the courier 144, such as in the case that the first buyer 116(1) is currently at a location that may be difficult for the courier 144 to reach. In either event, when the courier reaches the first buyer 116(1), an identity confirmation may be performed between the first buyer 116(1) and the courier 144. As one example, the courier application 148 may communicate directly with the buyer application 122 of the first buyer 116(1), such as through ultrasound or short-range radio transmission, to confirm that the courier 144 has located the correct person, such as by causing the buyer's application 122 to present a confirmation screen that can be displayed to the courier 144. As another example, the payment service program 130 may send a confirmation communication that causes the buyer application 122 to present the confirmation screen. Numerous other confirmation techniques will be apparent to those of skill in the art having the benefit of the disclosure herein.

As still another example, the merchant application 120 at a retail location may establish communication through ultrasound or short-range radio transmissions with buyer applications 122 of buyers 116 who are passing by the retail location. The merchant application 120 may push a communication to the buyer application 122 to notify the buyer 116 of sales, a special deal of the day, and so forth. Thus, the merchant application 120 may provide the merchant 114 with an opportunity to push notifications of daily deals or other retail promotions while the buyers 116 are present and in proximity to the retail location of the merchant 114. Numerous other variations will be apparent to those of skill in the art having the benefit of the disclosure herein.

Figure 2:
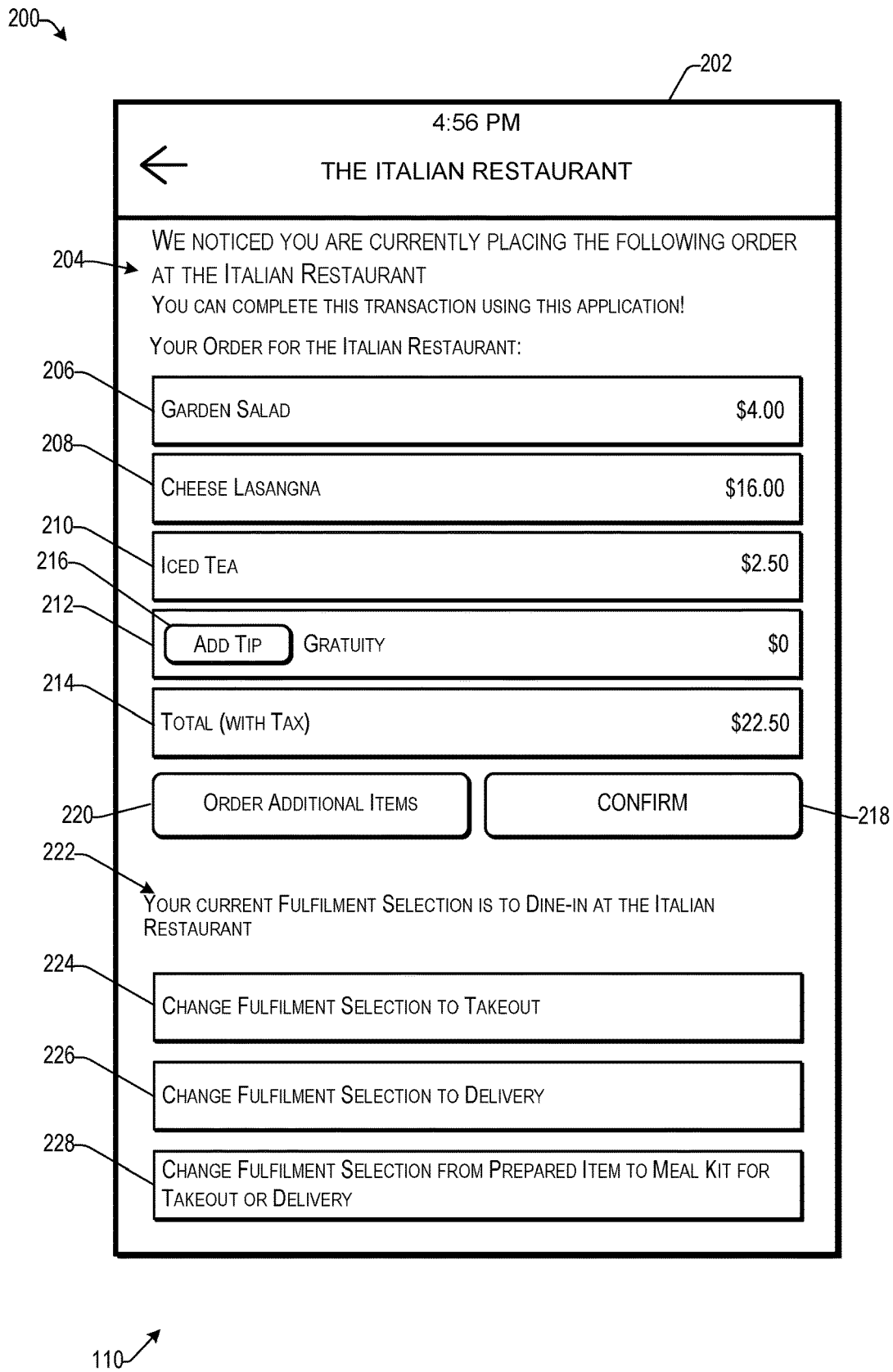
FIG. 2 illustrates an example graphical user interface (GUI) for enabling buyer application escalation according to some implementations.

FIG. 2 illustrates an example GUI 200 for enabling buyer application escalation according to some implementations. FIG. 2 illustrates an example user interface 200 presented on a display 202 associated with a buyer device 110. The user interface 200 and other user interfaces discussed herein are illustrated for use with a touch input device and, accordingly, the display 202 may include a touch sensor (not shown in FIG. 2). However, other types of user interfaces may be used with the examples herein and, accordingly, the examples herein are not limited to any particular type of user interfaces or user input devices.

In the illustrated example of FIG. 2, suppose that a buyer is placing an order, such as for dine-in, takeout, delivery, or meal kit, and may be placing the order in person, online, by telephone, or the like. As mentioned above, when the buyer has provided sufficient information to associate the buyer with a particular buyer account (e.g., within a threshold level of confidence), the payment service program may send a communication to the buyer, such as via the buyer application, through a text message, an email, or other communication technique previously selected by the buyer. The communication may invite the buyer to complete the order using the buyer application as discussed above.

As one example, the buyer may open the buyer application in response to receiving the communication. The buyer application may receive from the payment service program on the service computing device (or in other examples, directly from the merchant application on the merchant device) the order information already submitted by the buyer. In response to receipt of the order information, the buyer application may present the order information in the GUI 200. For example, as indicated at 204, the GUI 200 may include a message to the buyer and a listing of items ordered and associated prices for each item. For example, the message at 204 may invite the buyer to use the buyer application for completing the transaction. In this example, the order includes three items, namely, a garden salad 206, a cheese lasagna 208, and an iced tea 210, along with the price for each item ordered by the buyer. Further, in this example, the taxes may have been already been added into the price associated with each item 206-210. In other examples, however, the individual taxes for each item, or total tax for all of the items may be listed separately in the listing 204.

In addition, the GUI 200 includes the capability for adding a gratuity amount 212. In this example, the gratuity amount 212 has not been yet been determined or included in a total amount 214 for the order. In other examples, the buyer may designate a default gratuity that may be automatically included in each bill paid. Additionally, in some examples, the merchant may include an added gratuity with the order information presented in the GUI 200. To enable the buyer to add a desired gratuity amount to the total 214, the gratuity amount 212 includes a virtual control 216, such as a selectable virtual button, or the like, that the buyer may tap on, click on, or otherwise select to enable entry of a gratuity amount to add to the total 214.

In addition, the GUI 200 may include a confirmation virtual control 218 that the buyer may select when the buyer is ready to complete the order and authorize payment. Additionally, GUI 200 may include a selectable control 220 that may be selected by the buyer to enable the buyer to order additional items to be added to the order. Furthermore, the GUI 200 may include an indication 222 of the current fulfillment option selected by the buyer. In this example, suppose that the buyer originally intended to dine-in at the merchant location. However the GUI 200 provides additional fulfillment options that are available for the current order, which may include changing the fulfillment option to takeout as, indicated at 224, changing the fulfillment option to delivery by courier as indicated at 226, or changing the fulfillment option from a prepared meal to a meal kit for takeout or delivery, as indicated at 228.

If buyer delays responding to the communication or the presentation of the transaction information in the GUI 200, the service computing device may change the available fulfilment options presented by the buyer application, such as by removing the delivery fulfilment selection option 226 after passage of a threshold period of time after which it would no longer be practical to request a courier since the item may spoil or the like before the courier can arrive and deliver the item. The service computing device may determine the preparation time and spoilage time from item information provided by the merchant to determine when to no longer offer the delivery option. Furthermore, while one example of a GUI 200 is illustrated in FIG. 2, numerous variations will be apparent to those of skill in the art having the benefit of the disclosure herein.

Figure 3:
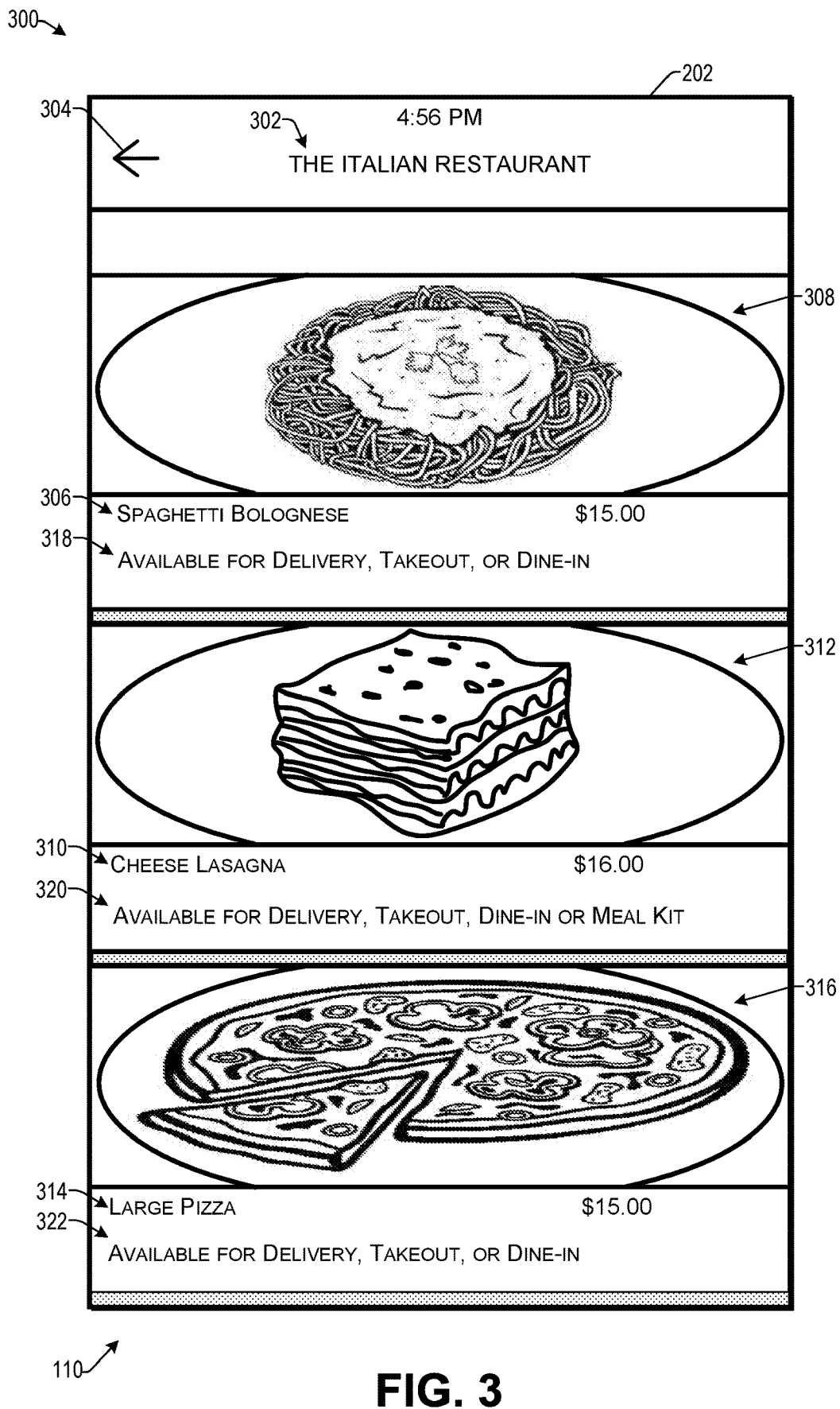
FIG. 3 illustrates an example GUI that may be presented on the display of the buyer device when selecting additional items according to some implementations.

FIG. 3 illustrates an example GUI 300 that may be presented on the display 202 of the buyer device when selecting additional items according to some implementations. In this example, suppose that the buyer selected the virtual control 220 in the GUI 200 for selecting additional items to add to the order discussed above with respect to FIG. 2. The GUI 300 includes the name 302 of the merchant, a back arrow 304 to enable the buyer to return to the previous GUI 200, and item information for a plurality of items offered by the merchant. As one example, the buyer may be able to scroll up and down or left and right to view additional menu items.

In the illustrated example, the GUI 300 includes an example of item information about three menu items including description and price 306, and an image 308 of spaghetti Bolognese; a description and price 310, and an image 312 of cheese lasagna; and a description and price 314 and an image 316 of a large pizza. In addition, the item information includes a description of the available for Philip modes for each item for instance, as indicated at 318, the spaghetti Bolognese is available for delivery, takeout or dine-in; as indicated at 320, the cheese lasagna is available for delivery, takeout, dine-in, or meal kit; and as indicated at 322, the large pizza is available for delivery, takeout, or dine-in.

The buyer may tap on or otherwise select one of the presented items 306, 310, or 314 for adding the presented item to the order discussed above with respect to FIG. 2. Furthermore, in some examples, the meal kit fulfillment option may be presented in the GUI 200 discussed when the cheese lasagna is selected. On the other hand, if the spaghetti Bolognese or the large pizza is selected, the fulfillment option for selecting the meal kit is not presented in the GUI 200, or may be presented as being grayed out, or the like.

Figure 4:
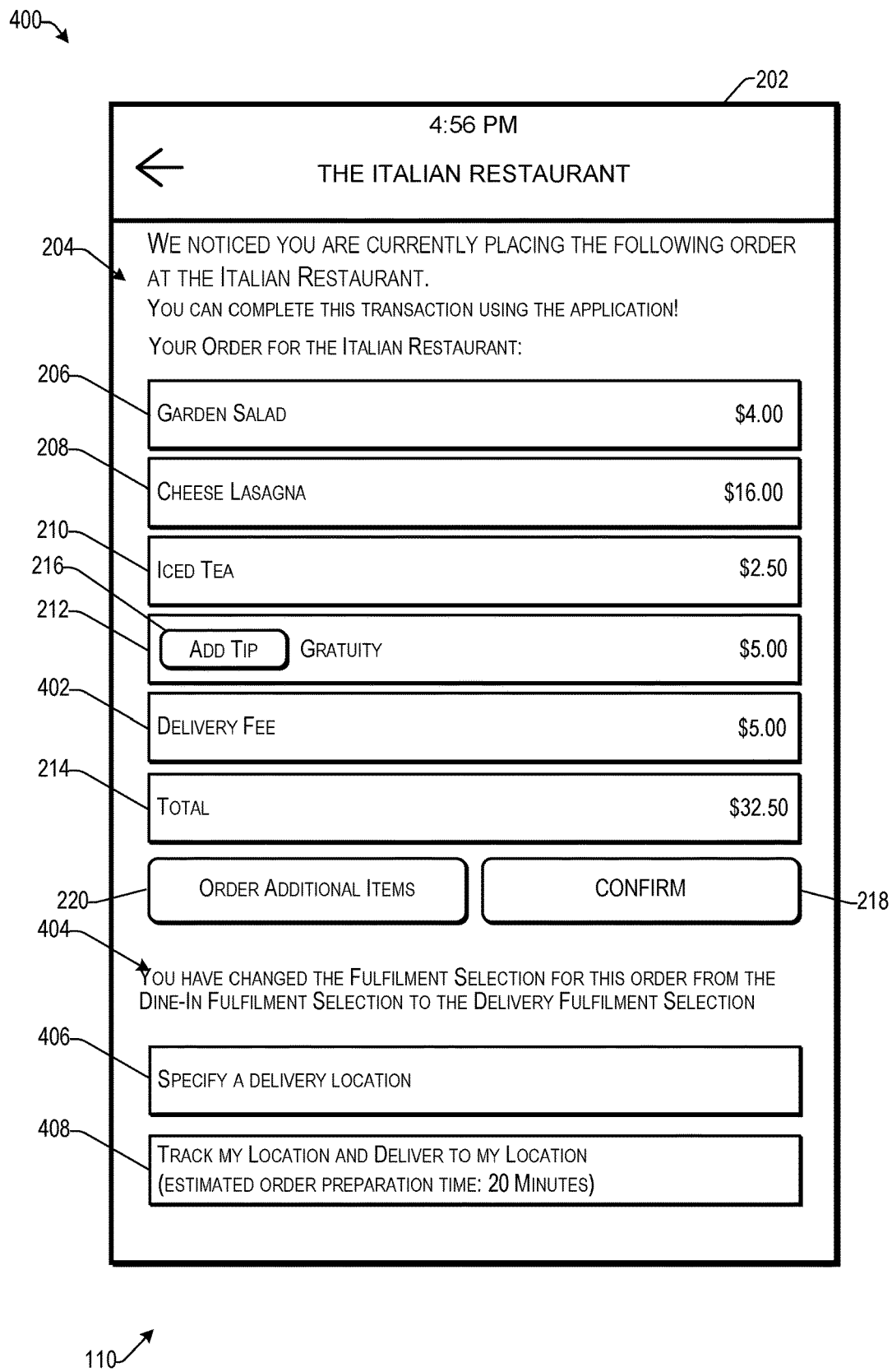
FIG. 4 illustrates an example GUI that may be presented on the display of the buyer device when changing a fulfilment option according to some implementations.

FIG. 4 illustrates an example GUI 400 that may be presented on the display 202 of the buyer device when changing a fulfilment option according to some implementations. In the example GUI 200 discussed above with respect to FIG. 2, suppose that the buyer selected the virtual control 226 to change the fulfillment option from dine-in to delivery. In response to the selection by the buyer of the delivery fulfilment option, the GUI 400 of FIG. 4 may be presented on the display 202 of the buyer device. In this example, as a result of the buyer switching to the delivery as fulfillment option, a delivery fee is added as indicated at 402.

In addition, the selection of the delivery fulfilment option by the buyer is displayed in the GUI 400, as indicated at 404. Furthermore, the buyer is requested to either specify a delivery location, as indicated at 406, or to elect to have the order delivered to the geolocation of the buyer when the order has been prepared, as indicated at 408. For instance, if the buyer selects the virtual control 406 for specifying a delivery location, the buyer may be prompted to enter an address or the like indicating the delivery location to which the buyer would like the order delivered by the courier. On the other hand, if the buyer elects to have his or her location tracked to enable the courier to deliver the order to the geolocation of the buyer, the buyer application periodically sends the current location of the buyer to the service computing device as discussed above with respect to FIG. 1. The estimated preparation time for the order is also provided so that the buyer may know approximately when the order will be delivered to the buyer.

Figure 5:
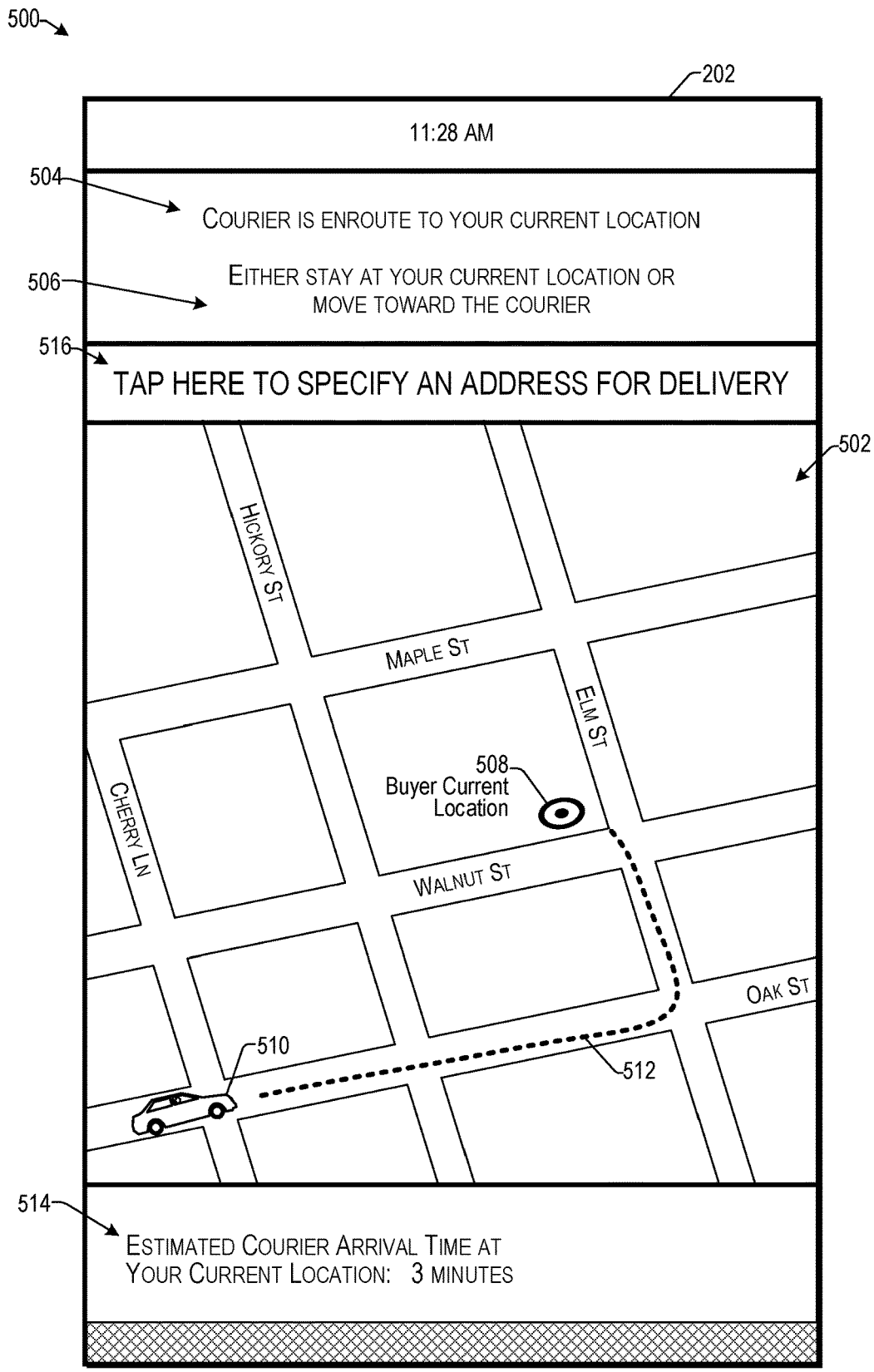
FIG. 5 illustrates an example GUI that may be presented on the display of the buyer device during delivery of an item by a courier according to some implementations.

FIG. 5 illustrates an example GUI 500 that may be presented on the display 202 of the buyer device during delivery of an item by a courier according to some implementations. In this example, suppose that the item has been prepared and the courier has picked up the item for delivery to the geolocation of the buyer. As mentioned above, the buyer device may be periodically polled and/or the buyer application may be configured to periodically send location information so that the payment service program may determine the current location of the buyer device 110.

The buyer application may present the GUI 500 upon receipt of a communication from the payment service program indicating that the courier is enroute to the current location of the buyer. Accordingly, the GUI 500 includes a map 502, and a notification 500 for indicating that the courier is in route to the location of the buyer. The GUI 500 further includes an instruction 506 for the buyer to either stay at the buyer's current location or move in a direction toward the courier. In addition, the map may show the current location of the buyer as indicated at 508, and the current location of the courier as indicated at 510. In addition, the map may show the route that the courier will be taking to arrive at the buyer's current location 508. In addition, the GUI 500 includes the estimated courier arrival time at the current location of the buyer as indicated at 514. Furthermore, should the buyer care to specify an address for the delivery, the buyer may select a virtual control 516 for specifying the address to which the buyer would like the item to be delivered by the courier.

Figure 6:
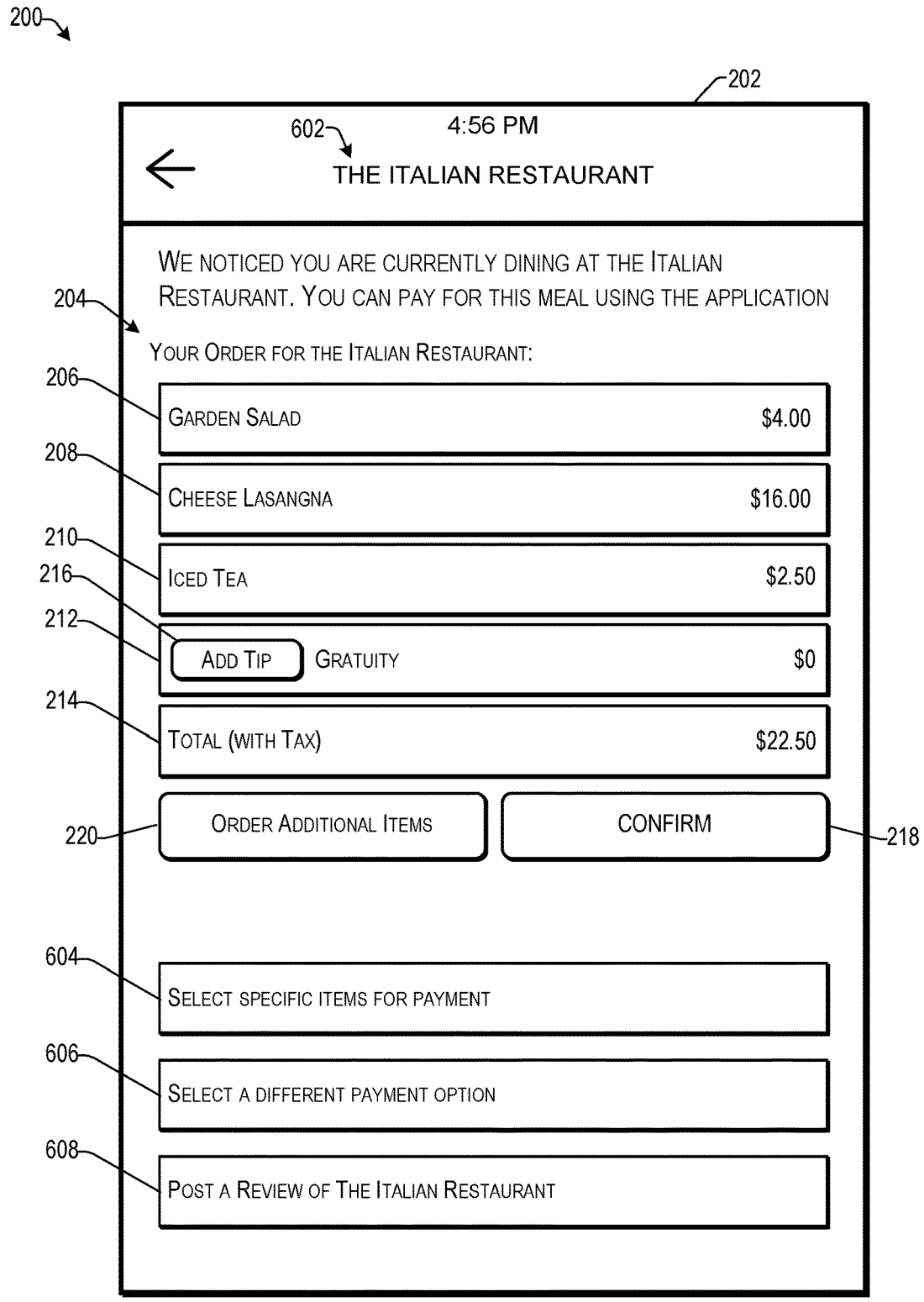
FIG. 6 illustrates an example GUI that may be presented on the display of the buyer device when escalating to payment with the buyer application according to some implementations.

FIG. 6 illustrates an example GUI 600 that may be presented on the display 202 of the buyer device when escalating to payment with the buyer application according to some implementations. In this example, suppose that a buyer has already been seated at a table in a restaurant and ordered a meal before the system obtains sufficient information to recognize that the buyer has the buyer application installed and is currently dining in a restaurant of a participating merchant. As mentioned above, the buyer may be recognized using any of a variety of techniques, such as through a payment instrument, through a phone number, through location technology, such as geofence technology, direct radio or ultrasound communication between the merchant device and the buyer device, or the like. As one example, after the merchant application and/or the payment service program and/or the buyer application has determined that the buyer is in a location of a participating merchant, the service computing device and/or the merchant computing device may send a communication to the buyer application to inquire as to whether the buyer would like to order additional items through the buyer application and/or complete the transaction using the buyer application. The communication may cause the buyer application to present the GUI 600 to give the buyer the option to use the buyer application to pay the buyer's bill.

In this example, the GUI 600 includes the name 602 of the merchant establishment, the invitation to use the buyer application to pay for the order and the listing 204 of the items ordered by the buyer. Thus, the buyer may add a gratuity as discussed above, and select confirm button 218 to pay for the meal. In addition, the GUI 600 includes a virtual control 604 that the buyer may select to select specific items in the bill for payment by the buyer. For instance, the buyer may be presented with the option to also pay the bill for a friend who is dining with the buyer, select specific items for payment, split the bill, or the like.

The GUI 600 further may include a virtual control 606 that the buyer may select to view different payment options that differ from the default payment option associated with the buyer's buyer account. For example, available payment options may include the default payment card on file, a secondary payment card, a mobile wallet payment, manual payment, etc. In addition, the GUI 600 may include a virtual control 608 that enables the buyer to post a review of the merchant and/or the ordered items. For instance, the buyer may leave a review that may be viewed by other users of the buyer application such as in the GUI or in a separate social media feed.

Figure 7:
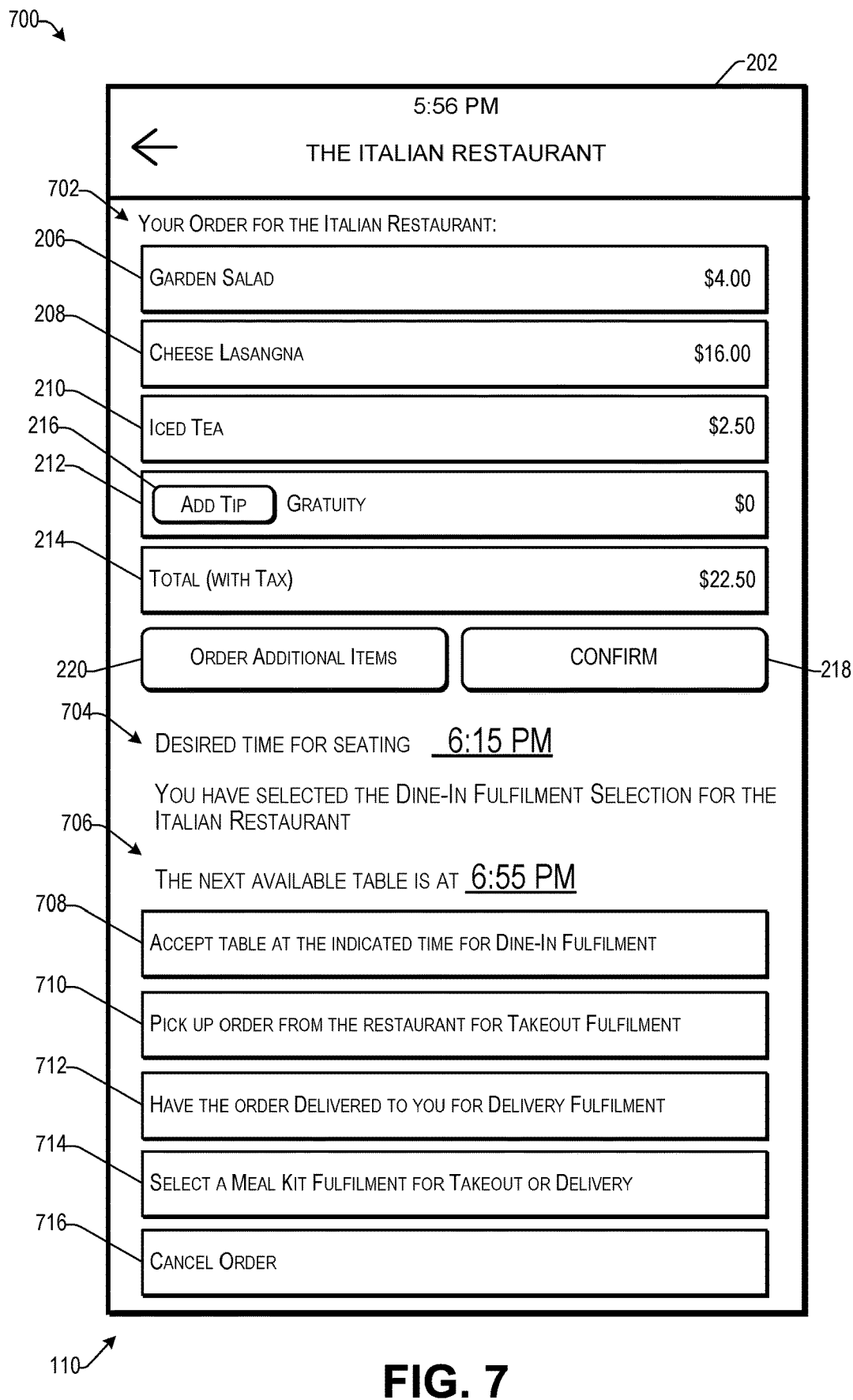
FIG. 7 illustrates an example GUI that may be presented on the display of the buyer device when changing a fulfilment option according to some implementations.

FIG. 7 illustrates an example GUI 700 that may be presented on the display 202 of the buyer device when changing a fulfilment option according to some implementations. In some examples, in addition to being able to pay the bill with the buyer application, the buyer can use the buyer device to place an order with the merchant for dining in the merchant restaurant. For instance, in response to receiving a request to place an order and an indication of a time at which the order is desired to be ready, the payment service program may send user interface information to cause the buyer application to present merchant item information on the buyer device. The buyer may select one or more items from the menu, and the selection may be forwarded by the payment service program to the merchant application along with an indication of a desired time for the buyer to dine-in at the restaurant. In the illustrated example, suppose that the user has selected the garden salad, cheese lasagna and iced tea, and would like to dine at 6:15 PM. However, the selected merchant may already have a number of tables reserved for that time and may not be able to accommodate the buyer until 6:55 PM.

Accordingly, the merchant application or the merchant may determine that a table is not available until 6:55 PM, and may forward this information to the payment service program. In turn, the payment service program may send a response to the buyer device to cause the buyer application on the buyer device to present the GUI 700. The GUI 700 shows the items selected 702 by the buyer so far and the cost for the order. In addition, the GUI 700 shows the desired time 704 selected by the buyer for dining in at the selected merchant location. Further, the GUI 700 includes the time 706 at which a table will be available for seating the buyer. The GUI 700 further includes a selectable virtual control 708 that may be selected by the buyer to accept the time indicated by the merchant. Thus, by doing so, the buyer may reserve a table in addition to placing an order for the selected items.

Alternatively, rather than wait for the next available table, the buyer may elect to pick up the order from the merchant or have the order delivered to the buyer. Accordingly, the GUI 700 includes a selectable virtual control 710 that the buyer may select to elect to pick up the order for takeout; a selectable virtual control 712 that the buyer may select to have the order delivered to the buyer; a selectable virtual control 714 that the buyer may select to obtain a meal kit for the order for takeout or delivery; and a selectable virtual control 716 that the buyer may select to cancel the order. Accordingly, if the restaurant is too busy to reserve a table for the buyer, the buyer may use the application to order the item and can then eat at the restaurant if a table opens up, or can order the item for takeout or have the item delivered to a specified location.

Figure 8:
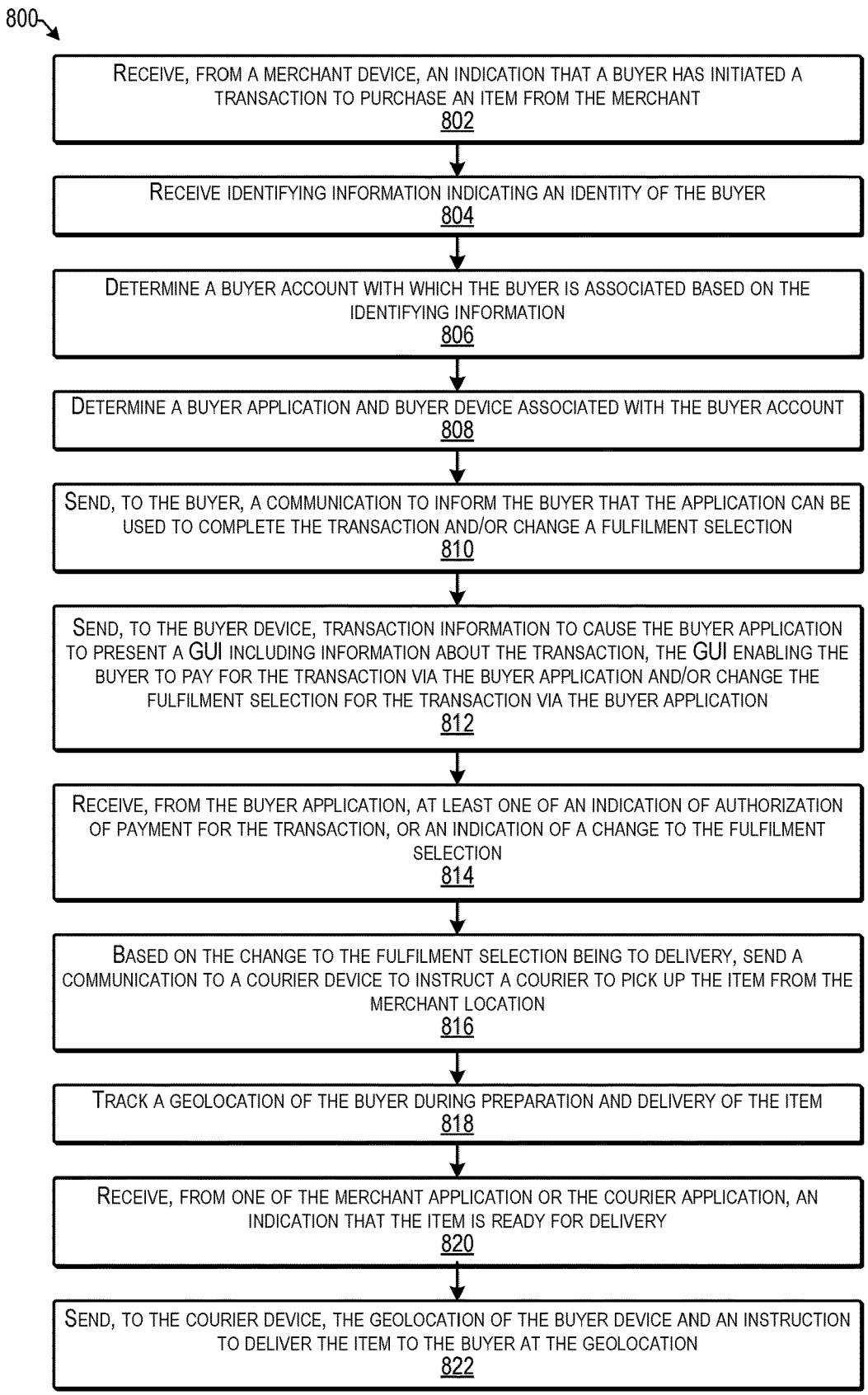
FIG. 8 illustrates an example process for escalating payment and/or fulfilment for a transaction to a buyer application according to some implementations.
Figure 9:
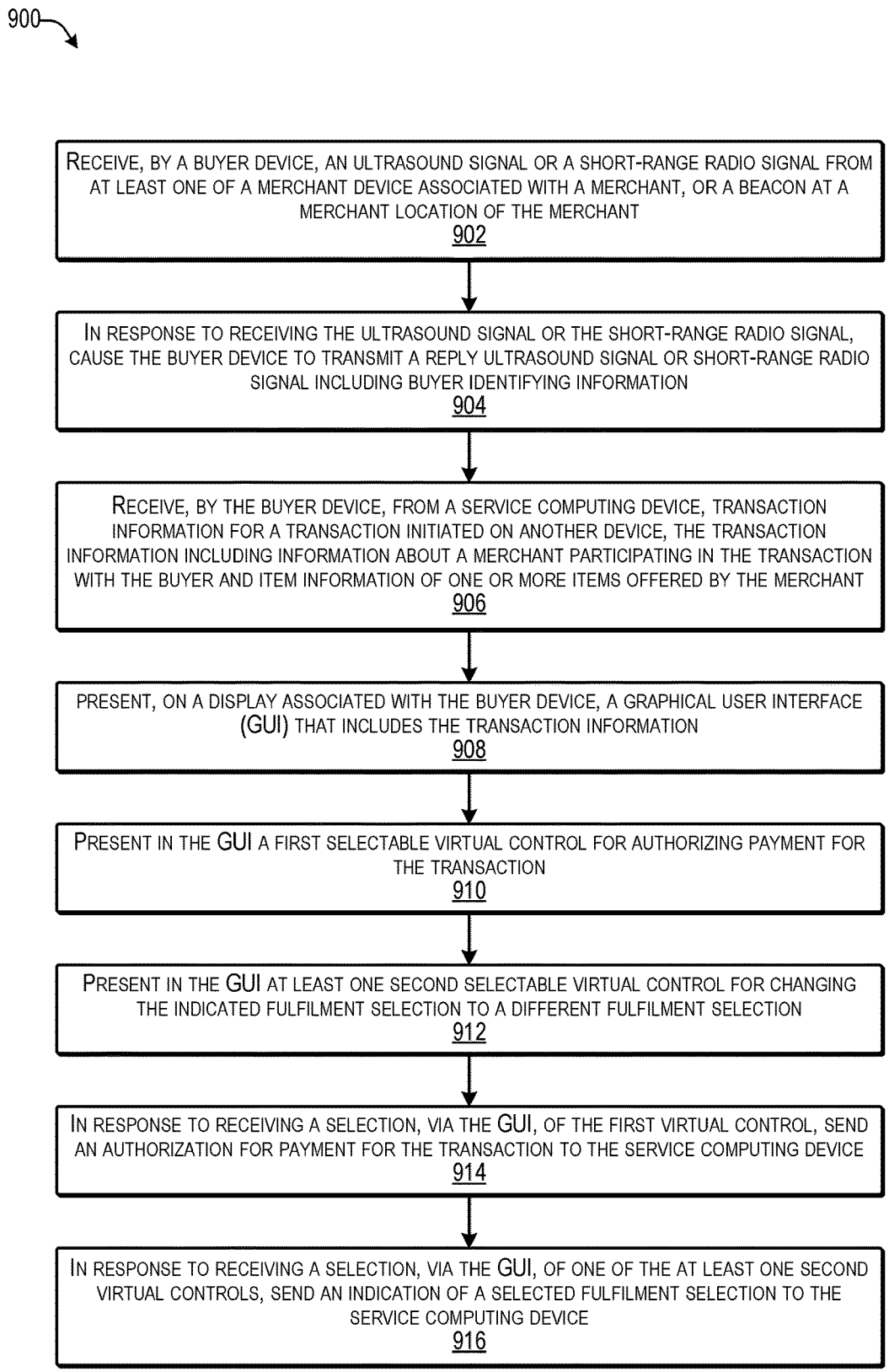
FIG. 9 illustrates an example process for escalating payment and/or fulfilment for a transaction to a buyer application according to some implementations.

FIGS. 8-9 are flow diagrams illustrating example processes including escalation to a buyer application according to some implementations. The processes of FIGS. 8-9 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the one or more processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the processes, or alternative processes, and not all of the blocks need be executed. For discussion purposes, the processes are described with reference to the environments, architectures, and systems described in the examples herein, although the processes may be implemented in a wide variety of other environments, architectures, and systems.

FIG. 8 illustrates an example process for escalating payment and/or fulfilment for a transaction to a buyer application according to some implementations. In some examples, the process 800 may be executed by one or more processors of the service computing device 102 associated with the service provider 104, or by other suitable computing device.

At 802, the computing device may receive, from a merchant device, an indication that a buyer has initiated a transaction to purchase an item from a merchant associated with the merchant device.

At 804, the computing device may receive identifying information indicating an identity of the buyer. For example, the computing device may receive at least one of: buyer identifying information based on an ultrasound signal transmitted between at least one of the merchant device, the buyer device, or an ultrasound beacon; buyer identifying information based on a short-range radio signal transmitted between at least one of the merchant device, the buyer device, or a wireless access point; or payment instrument information that corresponds to the buyer account of the buyer.

At 806, the computing device may determine a buyer account with which the buyer is associated based on the identifying information.

At 808, the computing device may determine a buyer application and buyer device associated with the buyer account.

At 810, the computing device may send, to the buyer, a communication to inform the buyer that the application can be used to complete the transaction and/or change a fulfilment selection.

At 812, the computing device may send, to the buyer device, transaction information to cause the buyer application to present a GUI including information about the transaction, the GUI enabling the buyer to pay for the transaction via the buyer application and/or change the fulfilment selection for the transaction via the buyer application.

At 814, the computing device may receive, from the buyer application, at least one of an indication of authorization of payment for the transaction, or an indication of a change to the fulfilment selection.

At 816, based on the change to the fulfilment selection being to delivery, the computing device may send a communication to a courier device to instruct a courier to pick up the item from the merchant location.

At 818, the computing device may track a geolocation of the buyer during preparation and delivery of the item.

At 820, the computing device may receive, from one of the merchant application or the courier application, an indication that the item is ready for delivery.

At 822, the computing device may send, to the courier device, the geolocation of the buyer device and an instruction to deliver the item to the buyer at the geolocation.

FIG. 9 illustrates an example process for escalating payment and/or fulfilment for a transaction to a buyer application according to some implementations. In some examples, the process 900 may be executed by one or more processors of the buyer device 110 associated with the buyer, or by other suitable computing device.

At 902, the buyer device may receive an ultrasound signal or a short-range radio signal from at least one of a merchant device associated with a merchant, or a beacon at a merchant location of the merchant.

At 904, in response to receiving the ultrasound signal or the short-range radio signal, the buyer device may transmit a reply ultrasound signal or short-range radio signal including buyer identifying information.

At 906, the buyer device may receive, from a service computing device, transaction information for a transaction initiated on another device, the transaction information including information about a merchant participating in the transaction with the buyer and item information of one or more items offered by the merchant.

At 908, the buyer device may present, on a display associated with the buyer device, a graphical user interface (GUI) that includes the transaction information.

At 910, the buyer device may present in the GUI a first selectable virtual control for authorizing payment for the transaction.

At 912, the buyer device may present in the GUI at least one second selectable virtual control for changing the indicated fulfilment selection to a different fulfilment selection.

At 914, in response to receiving, via the GUI, a selection of the first virtual control, the buyer device may send an authorization for payment for the transaction to the service computing device.

At 916, in response to receiving, via the GUI, a selection of one of the at least one second virtual controls, the buyer device may send an indication of a selected fulfilment selection to the service computing device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
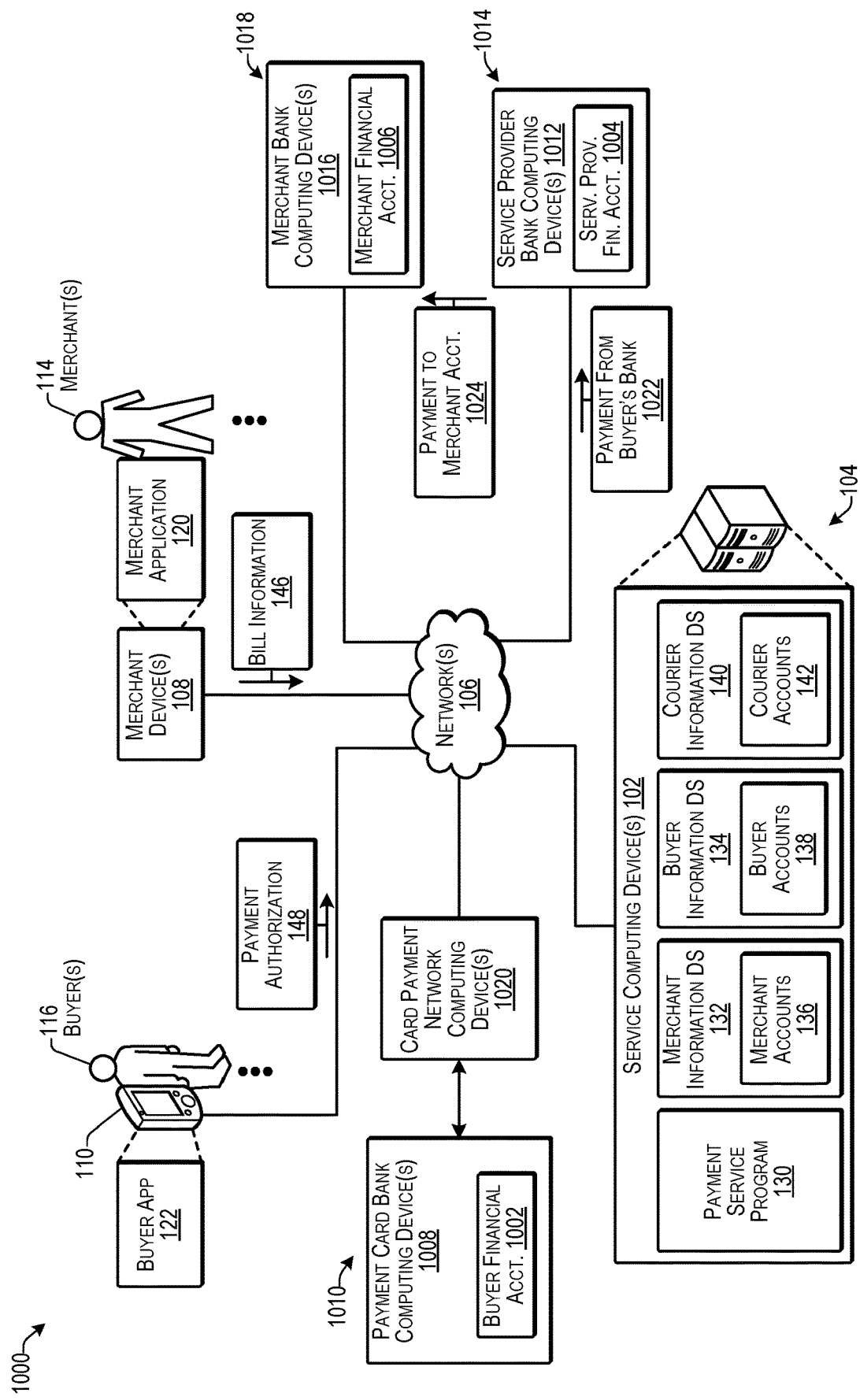
FIG. 10 illustrates an example architecture of a payment system able to provide a payment service according to some implementations.

FIG. 10 illustrates an example architecture of a payment system 1000 able to provide a payment service according to some implementations. In the example of FIG. 10, the service computing device 102 of the service provider 104 includes the payment service program 130, which may be executed to provide the location-based payment and POS transaction processing service discussed herein. The payment system 1000 may further include the one or more merchant devices 108 associated with one or more respective merchants 114 and one or more buyer devices 110 associated with one or more respective buyers 116. Accordingly, the service computing device(s) 102, the merchant device(s) 108, and the buyer device(s) 110 may be able to communicate with each other over the one or more networks 106.

The one or more networks 106 can include any appropriate network, including a wide area network, such as the Internet; a local area network, such as an intranet; a wireless network, such as a cellular network, a local wireless network, such as Wi-Fi and/or close-range wireless communications, such as BLUETOOTH® and BLUETOOTH® low energy; a wired network; or any other communication network, or any combination thereof. Accordingly, the one or more networks 106 may include both wired and/or wireless communication technologies, including BLUETOOTH®, BLUETOOTH® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The service computing device 102 may include one or more servers that are configured to perform secure electronic financial transactions, e.g., electronic payments for transactions between the buyer and the merchant, for example, through data communicated between the buyer device 110 and the service computing device 102, and data communicated between the merchant device 108 and the service computing device 102. Generally, when a buyer 116 and a merchant 114 enter into an electronic payment transaction, such as for payment of a bill, the transaction is processed by electronically transferring funds from a financial account associated with the payment system buyer account 138, i.e., a buyer financial account 1002, to a financial account associated with the service provider 104, i.e., a service provider financial account 1004, and transferring funds from the service provider financial account 1004 to a financial account associated with the payment system merchant account 136, i.e., a merchant financial account 1006.

In some examples, the buyer financial account 1002 may be maintained by one or more payment card bank computing devices 1008 associated with a card-issuing bank 1010 that issued a payment card to the buyer 116. For example, the buyer 116 may have provided payment card information from a particular payment card to the service provider 104 when signing up to use the electronic payment capability offered by the buyer application 122. Furthermore, the service provider financial account 1004 may be maintained by one or more service provider bank computing devices 1012 associated with a service provider bank 1014. Additionally, the merchant financial account 1006 may be maintained by one or more merchant bank computing devices 1016 associated with a merchant bank 1018.

The payment service program 130 and/or the merchant application 120 can also be configured to communicate with the one or more computing devices 1020 of a card payment network (e.g., MasterCard®, VISA®) over the one or more networks 106 to obtain authorizations to charge payments to the buyer financial account 1002. For example, the payment service program 130 may communicate with the service provider bank 1014, which acts as an acquiring bank, and/or may communicate directly or indirectly with the buyer bank 1010, which acts as an issuing bank. An acquiring bank may be a registered member of a card association (e.g., Visa®, MasterCard®), and may be part of a card payment network. An issuing bank may issue payment cards to buyers, and may pay acquiring banks for purchases made by cardholders to which the issuing bank has issued a payment card. Accordingly, in some examples, the computing device of an acquiring bank may communicate with the computing device of a card-issuing bank to obtain payment. Further, in some examples, the buyer may use a debit card instead of a credit card, in which case, the bank computing device of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

When providing the payment service to the merchant 114, the payment service program 130 may receive bill information 146 and/or other transaction information for processing payments made by buyers. For example, the payment service program 130 may receive transaction information, such as an amount of a POS transaction and payment instrument information. For instance, if the buyer 116 is using a payment card, the payment service program 130 may verify that the payment card is able to be used to pay for the transaction, such as by contacting a card payment network clearinghouse computing device 1020 or a payment card bank computing device 1008.

In addition to payment cards, a buyer 116 may carry the buyer device 110, as discussed above. The buyer device 110 may include the buyer application 122, which enables an associated electronic payment account to be used as a payment instrument. In some cases, the electronic payment account of the buyer 116 may be linked to one of the buyer's payment cards, such as a credit card, or other buyer financial account 1002. Accordingly, the buyer application 122 may enable the buyer 116 to pay for a transaction with the linked credit card without having to produce the credit card, thereby enabling a card-less payment to the merchant with the credit card. The buyer application 122 and the corresponding electronic payment account, can be associated with the buyer account 138 and various buyer information including, for example, the buyer's name, information describing the payment card linked to the payment system buyer account 138, and an email address linked to the payment system buyer account 138 to which receipts can be sent for electronic payment transactions that are conducted by the buyer 116 using the buyer application 122. Further, as an alternative to linking the payment system buyer account 138 to a credit card, the payment system buyer account 138 may be a different type of account, such as a billing account, a debit account, a savings account, a prepaid account having a prepaid quantity of money deposited therein, or the like. Additionally, while only a single buyer device 110 and a single merchant device 108 are illustrated in the example of FIG. 10, in some implementations, there may be thousands, hundreds of thousands, or more, of the buyer devices 110 and the merchant devices 108 associated with respective buyers 116 and merchants 114.

In general, when paying for a transaction, the buyer 116 can provide the amount of payment that is due to the merchant 114 using cash, check, a payment card, or by electronic payment using the buyer application 122 on the buyer device 110. The merchant 114 can interact with the merchant device 108 to process the transaction. For example, when the buyer 116 is paying for a transaction electronically with the buyer application 122, the payment service program 130 may contact the card payment network computing device 1020 with the payment card information and the transaction amount to receive authorization for charging the buyer's payment card financial account 1002 in the amount of the transaction. Similarly, if the buyer 116 were to pay the merchant with a physical payment card, the merchant application 120 may obtain payment authorization from the payment card network computing device 1020 either directly or via the payment service program 130 of the service provider 104. During POS transactions, the merchant device 108 can determine and send data describing the transactions, including, for example, the item(s) being purchased, the amount of the item(s), buyer information, and so forth. In some implementations, the payment service enables a card-less payment transaction, which may include a transaction conducted between the buyer 116 and the merchant 114 at a POS location during which an electronic payment account of the buyer 116 is charged without the buyer 116 having to physically present a payment card to the merchant 114 at the POS location. Consequently, the merchant 114 need not receive any details about the financial account of the buyer 116 for the transaction to be processed.

When the buyer 116 authorizes the payment service program 130 to charge the buyer's electronic account, the payment service program 130 may apply the charge to the payment card that the buyer has previously provided in connection with the buyer application 122 and the buyer account 138 of the buyer. Subsequently, the payment card issuing bank 1010 may transfer the payment from the buyer financial account 1002 to the service provider bank 1014 as a payment 1022 from the buyer's bank. Further, the payment service program 130 may credit the merchant's account, and may make a payment 1024 from the service provider account 1004 to the merchant financial account 1006. As one example, both the payment 1022 from the buyer's bank to the service provider bank, and the payment 1024 from the service provider bank to the merchant financial account 1006 may be made through batch fund transfers. For instance, in the United States, bank-to-bank transfers of funds may be made using a batch fund transfer technique referred to as an ACH (automated clearing house) payment. ACH payments employ a convention adopted by the United States banking industry that includes an electronic network for financial transactions in the United States. ACH includes processing of large volumes of credit and debit transactions in batches. Both the US government and the commercial financial sectors use ACH payments. Rules and regulations that govern the ACH network are established by NACHA (National Automated Clearing House Association) and the Federal Reserve. Further, in other countries, similar batch fund transfer techniques may be employed.

In some examples, the payment service program 130 is configured to determine whether a geographic location of the buyer device 110 is within a threshold geographic distance from a geographic location of the merchant device 108 or at an otherwise known geographic location, e.g., located at an merchant location associated with the merchant device 108, or the like. The payment service program 130 can determine a geographic location of the buyer device 110 using, for example, geolocation data provided by the buyer device 110, such as GPS information. Similarly, the payment service program 130 can determine a geographic location of the merchant device 108 using, for example, geolocation data provided by the merchant device 108 or using a geographic address, e.g., street address, provided by the merchant and associated with the merchant account of the merchant.

Figure 11:
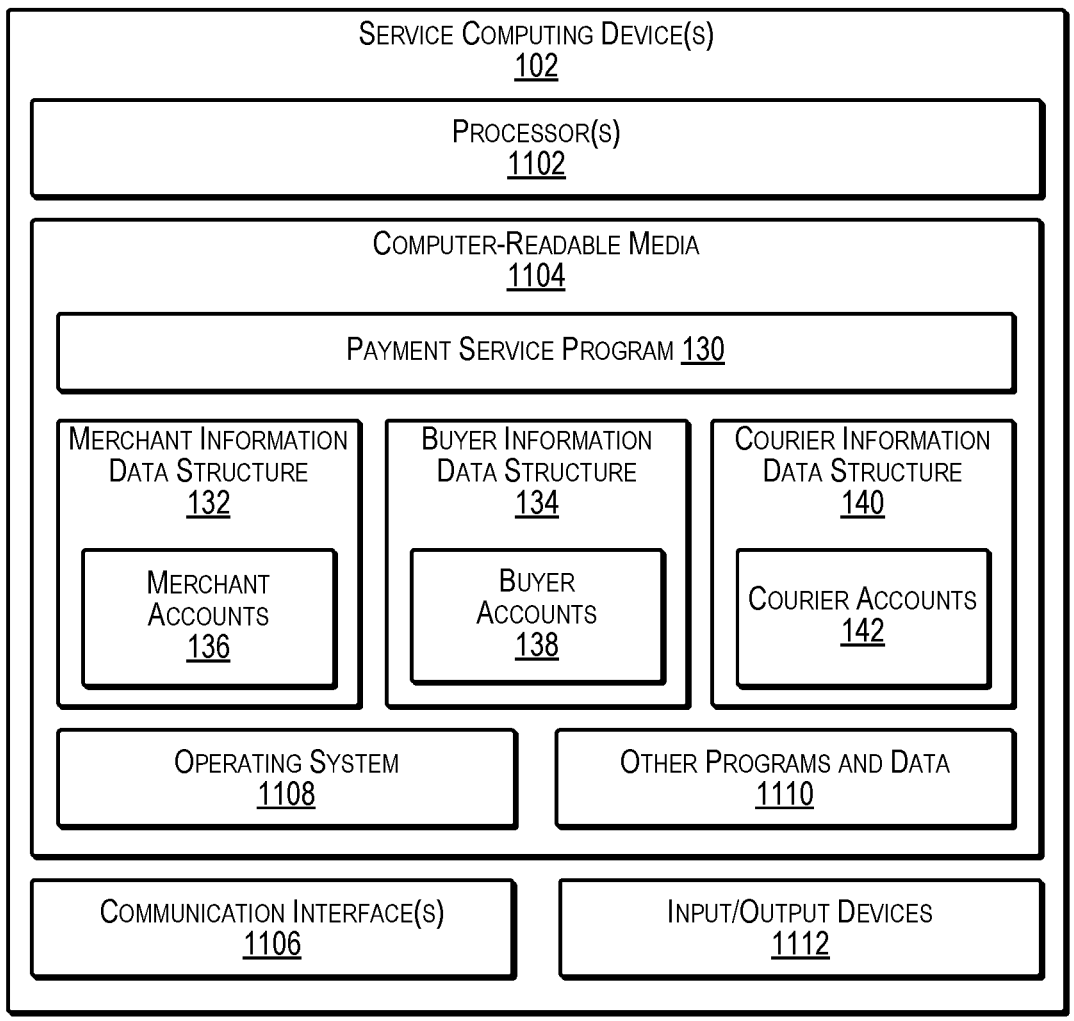
FIG. 11 illustrates select components of an example service computing device according to some implementations.

FIG. 11 illustrates select components of the service computing device(s) 102 according to some implementations. The service computing device(s) 102 may be maintained and/or operated by the service provider 104 that provides the payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 102 as being present in a single location, these components and data may alternatively be distributed across different computing devices and different locations in any manner Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different buyers or enterprises.

In the illustrated example, each service computing device 102 may include one or more processors 1102, one or more computer-readable media 1104, and one or more communication interfaces 1106. Each processor 1102 may be a single processing unit or a number of processing units, and may include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions. For instance, the processor(s) 1102 may be one or more hardware processors and/or logic circuits of any suitable type specifically programmed or otherwise configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 may include volatile and nonvolatile memory and/or removable and non-removable media implemented in any type of technology for storage of information, such as computer-readable instructions, data structures, program modules, or other data. Such computer-readable media 1104 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1104 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 1104 may be used to store any number of functional components that are executable by the processors 1102. In many implementations, these functional components comprise instructions or programs that are executable by the processors 1102 and that, when executed, specifically configure or otherwise program the one or more processors 1102 to perform the actions attributed above to the service computing device 102. Functional components stored in the computer-readable media 1104 may include the payment service program 130, as described above, which may be executed to provide the payment services described herein. Additional functional components stored in the computer-readable media 1104 may include an operating system 1108 for controlling and managing various functions of the service computing device(s) 102.

In addition, the computer-readable media 1104 may store data used for performing the operations described herein. Thus, the computer-readable media may store the merchant information data structure 132, including the merchant accounts 136, the buyer information data structure 134, including the buyer accounts 138, and the courier information data structure 140, including the courier accounts 142. The service computing device 102 may also include or maintain other functional components and data, such as other programs and data 1110, which may include programs, drivers, etc., and the data used or generated by the functional components. Further, the service computing device 102 may include many other logical, programmatic, and physical components, of which those described above are merely examples that are related to the discussion herein.

The communication interface(s) 1106 may include one or more interfaces and hardware components for enabling communication with various other devices, such as over the network(s) 106. For example, communication interface(s) 1106 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The service computing device 102 may further be equipped with various input/output (I/O) devices 1112. Such I/O devices 1112 may include a display, various user interface controls (e.g., buttons, joystick, keyboard, mouse, touch screen, etc.), audio speakers, connection ports, and so forth.

Figure 12:
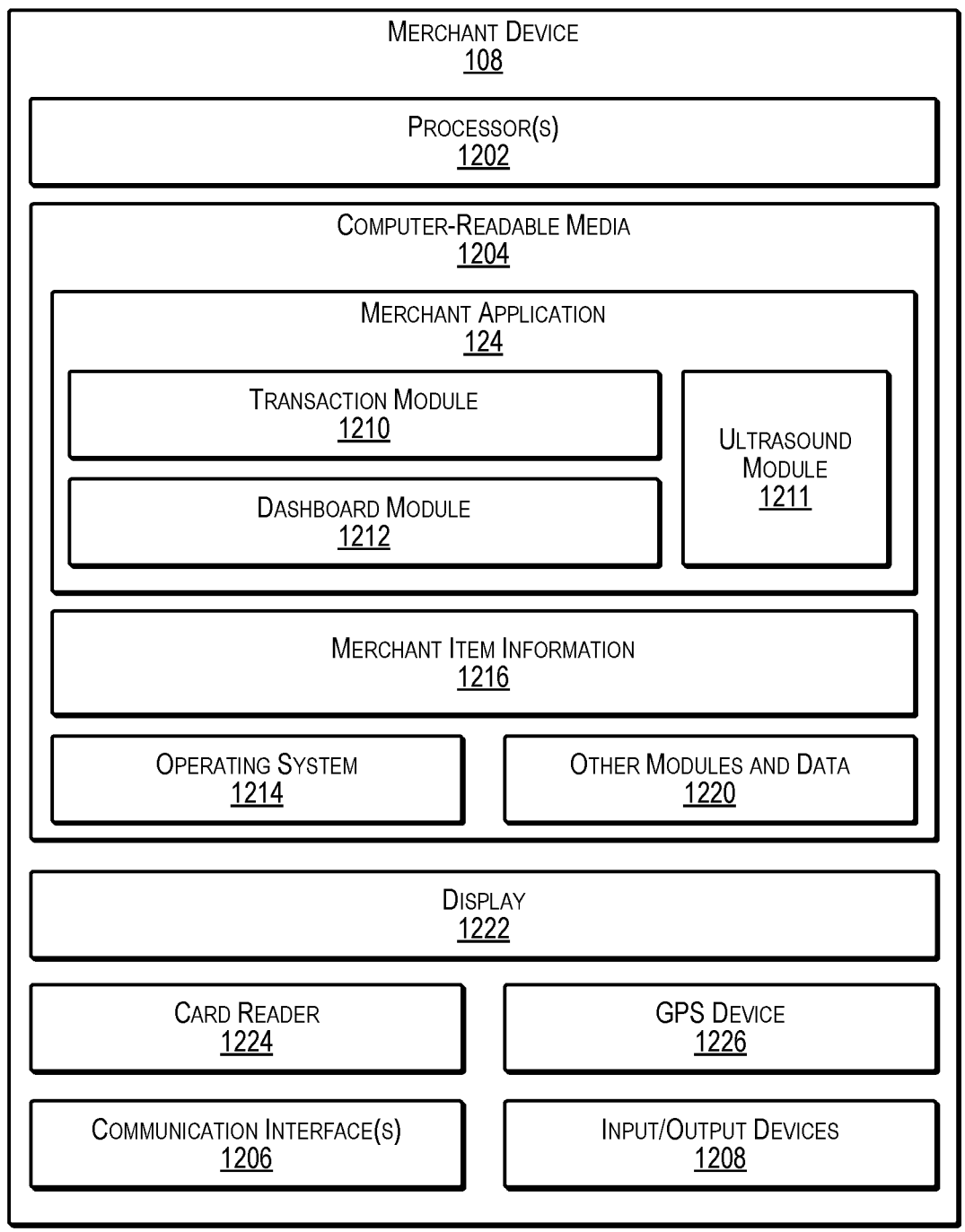
FIG. 12 illustrates select example components of an example merchant device according to some implementations.

FIG. 12 illustrates select example components of an example merchant device 108 according to some implementations. The merchant device 108 may be any suitable type of computing device, e.g., portable, semi-portable, semi-stationary, or stationary. Some examples of the merchant device 108 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 108 includes at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or otherwise configured to execute the algorithms and processes described herein. The processor 1202 can be configured to fetch and execute computer-readable processor-executable instructions stored in the computer-readable media 1204.

Depending on the configuration of the merchant device 108, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1204 may include, but is not limited to, RAM, ROM, EEPROM, flash memory, solid-state storage, magnetic disk storage, optical storage, and/or other computer-readable media technology. Further, in some cases, the merchant device 108 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules, or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the merchant device 108. Functional components of the merchant device 108 stored in the computer-readable media 1204 may include the merchant application 120. In this example, the merchant application 120 includes a transaction module 1210, an ultrasound module 1211, and a dashboard module 1212. For example, the transaction module 1210 may present an interface, such as a payment interface, to enable the merchant to conduct transactions, receive payments, and so forth, as well as for communicating with the service computing device 102 for processing payments and sending transaction information, and in some cases for communicating with the buyer devices 110, such as through short range radio.

The ultrasound module 1211 may configure the merchant device to periodically emit an ultrasound signal that may be recognized by a buyer device executing the buyer application within sound range of the merchant device 108. Further, the ultrasound module 1211 may receive and recognize ultrasound signals issued by buyer devices. Further, the dashboard module 1212 may present a setup interface to enable the merchant to setup items, such as for adding new items to a menu, modifying information for existing items, and so forth. The dashboard module 1212 may further enable the merchant to manage the merchant's account, such as for viewing the merchant's account, controlling the merchant's preferences, reviewing saved or new item information, and the like. Additional functional components may include an operating system 1214 for controlling and managing various functions of the merchant device 108 and for enabling basic user interactions with the merchant device 108.

In addition, the computer-readable media 1204 may also store data, data structures, and the like, that are used by the functional components. For example, data stored by the computer-readable media 1204 may include merchant item information 1216 that includes information about the items offered by the merchant, which may include a menu or other list of items currently available from the merchant, images of the items, descriptions of the items, prices of the items, and so forth. Depending on the type of the merchant device 108, the computer-readable media 1204 may also optionally include other functional components and data, such as other modules and data 1220, which may include programs, drivers, etc., and the data used or generated by the functional components. Further, the merchant device 108 may include many other logical, programmatic, and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 12 further illustrates that the merchant device 108 may include a display 1222. The merchant device 108 may further include the one or more I/O devices 1208. The I/O devices 1208 may include speakers, a microphone, a camera, and various user controls (e.g., buttons, a joystick, a keyboard, a keypad, etc.), a haptic output device, and so forth.

In addition, the merchant device 108 may include or may be connectable to a card reader 1224. In some examples, the card reader 1224 may plug into a port in the merchant device 108, such as a microphone/headphone port, a data port, or other suitable port. The card reader 1224 may include a read head for reading a magnetic strip of a payment card, and further may include encryption technology for encrypting the information read from the magnetic strip. Alternatively, numerous other types of card readers may be employed with the merchant device 108 herein, depending on the type and configuration of the merchant device 108.

Other components included in the merchant device 108 may include various types of sensors, which may include a GPS device 1226 able to indicate location information, as well as other sensors (not shown) such as an accelerometer, gyroscope, compass, proximity sensor, and the like. Additionally, the merchant device 108 may include various other components that are not shown, examples of which include removable storage, a power source, such as a battery and power control unit, and so forth.

Figure 13:
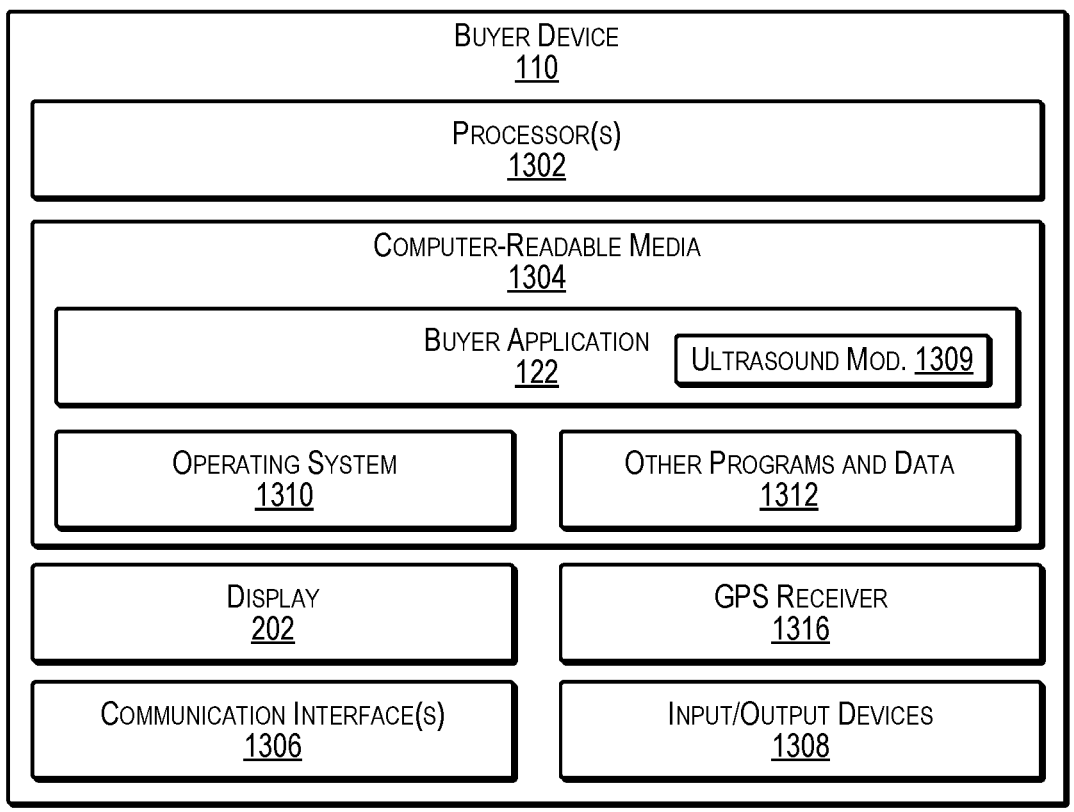
FIG. 13 illustrates select example components of an example buyer device above according to some implementations.

FIG. 13 illustrates select example components of the buyer device 110 according to some implementations. The buyer device 110 may be any of a number of different types of portable computing devices. Some examples of the buyer device 110 may include smart phones and mobile communication devices; tablet computing devices; laptops, netbooks and other portable computers; wearable computing devices and/or body-mounted computing devices, which may include watches, wrist bands, and augmented reality devices, such as helmets, goggles or glasses; and any other portable device capable of sending communications and performing the functions according to the techniques described herein.

In the example of FIG. 13, the buyer device 110 includes components such as at least one processor 1302, one or more computer-readable media 1304, one or more communication interfaces 1306, and one or more input/output (I/O) devices 1308. Each processor 1302 may itself comprise one or more processors or processing cores. For example, the processor 1302 can be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or otherwise configured to execute the algorithms and processes described herein. The processor 1302 can be configured to fetch and execute computer-readable processor-executable instructions stored in the computer-readable media 1304.

Depending on the configuration of the buyer device 110, the computer-readable media 1304 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1304 may include, but is not limited to, RAM, ROM, EEPROM, flash memory, solid-state storage, magnetic disk storage, optical storage, and/or other computer-readable media technology. Further, in some cases, the buyer device 110 may access external storage, such as RAID storage systems, storage arrays, network attached storage, storage area networks, cloud storage, or any other medium that can be used to store information and that can be accessed by the processor 1302 directly or through another computing device or network. Accordingly, the computer-readable media 1304 may be computer storage media able to store instructions, modules, or components that may be executed by the processor 1302. Further, when mentioned, non-transitory computer-readable media exclude media such as energy, carrier signals, electromagnetic waves, and signals per se.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the buyer device 110. Functional components of the buyer device 110 stored on the computer-readable media 1304 may include the buyer application 122, as discussed above. In this example, the buyer application 122 includes an ultrasound module 1309 that may detect and decode ultrasound signals from a merchant device or an ultrasound beacon, and may cause the buyer device to issue an ultrasound signal, such as an encoded buyer identifier, or the like, that can be recognized by at least one of the merchant device or the service computing device. Additional functional components may include an operating system 1314 for controlling and managing various functions of the buyer device 110 and for enabling basic user interactions with the buyer device 110.

In addition, the computer-readable media 1304 may also store data, data structures, and the like, that are used by the functional components. Depending on the type of the buyer device 110, the computer-readable media 1304 may also optionally include other functional components and data, such as other modules and data 1316, which may include applications, programs, drivers, etc., and the data used or generated by the functional components. Further, the buyer device 110 may include many other logical, programmatic, and physical components, of which those described are merely examples that are related to the discussion herein.

The communication interface(s) 1306 may include one or more interfaces and hardware components for enabling communication with various other devices, such as over the network(s) 106 or directly. For example, communication interface(s) 1306 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 13 further illustrates that the buyer device 110 may include the display 202, mentioned above. In some examples, the display 202 may have a touch sensor associated with the display 202 to provide a touchscreen display configured to receive touch inputs for enabling interaction with a GUI presented on the display 202. Accordingly, implementations herein are not limited to any particular display technology. Alternatively, in some examples, the buyer device 110 may not include a display.

The buyer device 110 may further include the one or more I/O devices 1308. The I/O devices 1308 may include speakers, a microphone, a camera, and various user controls (e.g., buttons, a joystick, a keyboard, a keypad, etc.), a haptic output device, and so forth.

Other components included in the buyer device 110 may include various types of sensors, which may include a GPS receiver 1316 able to indicate location information, as well as various other sensors (not shown) such as an accelerometer, gyroscope, compass, proximity sensor, and the like. Additionally, the buyer device 110 may include various other components that are not shown, examples of which include removable storage, a power source, such as a battery and power control unit, and so forth.

Furthermore, the courier device 146 may have a hardware configuration similar to that of the buyer device, but with different functional components. For example, the courier device 146 may include the courier application 148 instead of, or in addition to, the buyer application 122.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, by a processor, from a merchant device executing a merchant application, an indication that a buyer has initiated a transaction to purchase an item from a merchant associated with the merchant device, the merchant application configuring the merchant device as a point of sale (POS) device, wherein the transaction is for dining-in at a merchant location associated with the merchant;
   determining that the buyer is associated with a buyer account, wherein a buyer device having a buyer application executable thereon is associated with the buyer account;
   sending, to the buyer application on the buyer device, transaction information related to the transaction to enable the buyer to pay for the transaction via the buyer application and/or select, via the buyer application, a fulfilment selection for the transaction that includes at least one of dine-in, take out, delivery, or a meal kit;
   receiving, from the buyer device via the buyer application, payment for the transaction to place an order for the item, and a fulfilment selection of one of dine-in or take out for the order;
   subsequent to placement of the order for the item and during preparation of the order, receiving, from the buyer device, via a user interface presented by the buyer application on the buyer device, an indication of a selection of a first virtual control indicating a change in the fulfilment selection to delivery that uses a courier and a request to track a location of the buyer device for delivering the item, wherein the first virtual control is presented in the GUI based on determining that at least one courier device is within a threshold courier travel time to the merchant location, the threshold courier travel time determined based at least on a predicted courier travel time determined by receiving a current geolocation of the at least one courier device, wherein the GUI includes selectable virtual controls for indicating alternative fulfilment selections, the selectable virtual controls including the first virtual control, and wherein the buyer application is configured to disable the first virtual control for selecting delivery that uses a courier following elapse of a threshold time and based in part on a spoilage time for the item;
   based on receiving, from the buyer device, the indication of the fulfilment selection as delivery that uses a courier, sending, to a courier device of the at least one courier device, an instruction to pick up the item from the merchant location;
   receiving, from one of the merchant device or the courier device an indication that the item is ready for delivery;
   based on the indication that the item is ready for delivery, and based on the request to track the location of the buyer device for delivering the item, receiving, from the buyer device, an updated geolocation of the buyer device; and
   responsive to the indication that the item is ready for delivery, and based on the request to track the location of the buyer device for delivering the item, sending, to the courier device, the updated geolocation of the buyer device and an instruction to deliver the item to the buyer at the updated geolocation.

2. The method as recited in claim 1, wherein determining that the buyer is associated with the buyer account comprises at least one of:
   receiving buyer identifying information based on an ultrasound signal transmitted between at least one of the merchant device, the buyer device, or an ultrasound beacon;
   receiving buyer identifying information based on a short-range radio signal transmitted between at least one of the merchant device, the buyer device, or a wireless access point; or
   receiving payment instrument information that corresponds to the buyer account of the buyer.

3. The method as recited in claim 1, wherein sending, to the buyer application on the buyer device, the transaction information related to the transaction causes the buyer application to present information about the transaction in a graphical user interface on the buyer device.

4. A system comprising:
   one or more processors; and
   one or more computer-readable media storing instructions which, when executed by the one or more processors, cause the one or more processors to perform operations comprising:
   receiving, from a merchant device executing a merchant application, an indication that a buyer has initiated a transaction to purchase an item from a merchant associated with the merchant device, the merchant application configuring the merchant device as a point of sale (POS) device;

determining that the buyer is associated with a buyer account, the buyer account having a buyer device and a buyer application associated therewith;

sending, to the buyer application on the buyer device, transaction information related to the transaction to enable the buyer to at least one of pay for the transaction via the buyer application or select, via the buyer application, a fulfilment selection for the transaction;

receiving, from the buyer device via the buyer application, payment for the transaction to place an order for the item, and a fulfilment selection of one of dine-in or take out for the order;

subsequent to placement of the order for the item and during preparation of the order, receiving, from the buyer device, via a graphical user interface (GUI) presented by the buyer application on the buyer device, an indication of a selection of a first virtual control indicating a change in the fulfilment selection to delivery that uses a courier and a request to track a location of the buyer device for delivering the item, wherein the first virtual control is presented in the GUI based on determining that at least one courier device is within a threshold courier travel time to the merchant location, the threshold courier travel time determined based at least on a predicted courier travel time determined by receiving a current geolocation of the at least one courier device, wherein the GUI includes selectable virtual controls for indicating alternative fulfilment selections, the selectable virtual controls including the first virtual control, and wherein the buyer application is configured to disable the first virtual control for selecting delivery that uses a courier following elapse of a threshold time and based in part on a spoilage time for the item;

based on receiving, from the buyer device, the indication of the fulfilment selection as delivery that uses a courier, sending, to a courier device of the at least one courier device, an instruction to pick up the item from the merchant location;

receiving, from one of the merchant device or the courier device an indication that the item is ready for delivery;

based on the indication that the item is ready for delivery, and based on the request to track the location of the buyer device for delivering the item, receiving, from the buyer device, an updated geolocation of the buyer device; and responsive to the indication that the item is ready for delivery, and based on the request to track the location of the buyer device for delivering the item, sending, to the courier device, the updated geolocation of the buyer device and an instruction to deliver the item to the buyer at the updated geolocation.

5. The system as recited in claim 4, wherein the operation of sending, to the buyer application on the buyer device, the transaction information related to the transaction at least partially causes the buyer application to present information about the transaction in the GUI on the buyer device.

6. The system as recited in claim 4, the operations further comprising:
determining that a first fulfilment selection of the alternative fulfilment selections is available for a first subset of items offered by the merchant and not available for a second subset of items offered by the merchant; and
based on determining that the item in the transaction is included in the first subset, including with the transaction information an indication to present a virtual control for the first fulfilment selection in the GUI.

7. The system as recited in claim 4, the operations further comprising:
receiving, from the buyer device, an indication of a time the buyer would like to receive the item for dining at the merchant location;
receiving, from the merchant device, an indication of a later time at which a table is available at the merchant location; and
sending, to the buyer application on the buyer device, user interface information to at least partially cause the GUI to present a virtual control to enable the buyer to select at least one alternative fulfilment selection for receiving the item, including at least one of takeout of the item, delivery of the item, or a meal kit for preparing the item.

8. The system as recited in claim 4, the operations further comprising:
receiving, from the buyer device, via selection of the first virtual control presented in the GUI by the buyer application executing on the buyer device, the request to track the location of the buyer device for delivering the item.

9. The system as recited in claim 4, the operation of determining that the buyer is associated with the buyer account further comprising at least one of:
receiving buyer identifying information based on an ultrasound signal transmitted between the buyer device and at least one of the merchant device or an ultrasound beacon;
receiving buyer identifying information based on a short-range radio signal transmitted between the buyer device and at least one of the merchant device or a wireless access point; or
receiving payment instrument information that corresponds to the buyer account of the buyer.

10. The system as recited in claim 4, the operations further comprising
receiving, from the buyer device, authorization for payment for the item; and
receiving, from the buyer device, a review of the item and/or the merchant.

11. A method comprising:
receiving, by one or more processors, from a merchant device executing a merchant application, an indication that a buyer has initiated a transaction to purchase an item from a merchant associated with the merchant device;
determining, by the one or more processors, that the buyer is associated with a buyer account, the buyer account having a buyer device and a buyer application associated therewith;
sending, by the one or more processors, to the buyer application on the buyer device, transaction information related to the transaction to enable the buyer to pay for the transaction via the buyer application and/or select, via the buyer application, a fulfilment selection for the transaction;
receiving, from the buyer device via the buyer application, payment for the transaction to place an order for the item, and a fulfilment selection of one of dine-in or take out for the order;
subsequent to placement of the order for the item and during preparation of the order, receiving, by the one or more processors, from the buyer device, via a graphical user interface (GUI) presented by the buyer application on the buyer device, an indication of a selection of a first virtual control indicating a change in the fulfilment selection to delivery that uses a courier and a request to track a location of the buyer device for delivering the item, wherein the first virtual control is presented in the GUI based on determining that at least one courier device is within a threshold courier travel time to the merchant location, the threshold courier travel time determined based at least on a predicted courier travel time determined by receiving a current geolocation of the at least one courier device, wherein the GUI includes selectable virtual controls for indicating alternative fulfilment selections, the selectable virtual controls including the first virtual control, and wherein the buyer application is configured to disable the first virtual control for selecting delivery that uses a courier following elapse of a threshold time and based in part on a spoilage time for the item;

based on receiving, from the buyer device, the indication of the fulfilment selection as delivery that uses a courier, sending, to a courier device of the at least one courier device, an instruction to pick up the item from the merchant location;

receiving, from one of the merchant device or the courier device an indication that the item is ready for delivery;

based on the indication that the item is ready for delivery, and based on the request to track the location of the buyer device for delivering the item, receiving, from the buyer device, an updated geolocation of the buyer device; and responsive to the indication that the item is ready for delivery, and based on the request to track the location of the buyer device for delivering the item, sending, to the courier device, the updated geolocation of the buyer device and an instruction to deliver the item to the buyer at the updated geolocation.

12. The method as recited in claim 11, wherein sending, to the buyer application on the buyer device, the transaction information related to the transaction at least partially causes the buyer application to present information about the transaction in the GUI on the buyer device, the method further comprising:

receiving, via the GUI, the indication of the fulfilment selection as delivery that uses a courier; and performing at least one action based on the indication of the fulfilment selection.

13. The method as recited in claim 11, further comprising:
receiving, from the buyer device, an indication of a time at which the buyer would like to receive the item for dining at the merchant location;

receiving, from the merchant device, an indication of a later time at which a table is available at the merchant location; and sending, to the buyer application on the buyer device, user interface information to at least partially cause the buyer application to present the GUI including the selectable virtual controls to enable the buyer to select at least one alternative fulfilment selection for receiving the item, including at least one of takeout of the item, delivery of the item, or a meal kit for preparing the item.

14. The method as recited in claim 11, further comprising:
receiving, from the buyer device, via selection of the first virtual control presented in the GUI by the buyer application executing on the buyer device, the request to track the location of the buyer device for delivering the item.

15. The method as recited in claim 11, wherein determining that the buyer is associated with the buyer account further comprises at least one of:

receiving buyer identifying information based on an ultrasound signal transmitted between the buyer device and at least one of the merchant device or an ultrasound beacon;

receiving buyer identifying information based on a short-range radio signal transmitted between the buyer device and at least one of the merchant device or a wireless access point; or receiving payment instrument information that corresponds to the buyer account of the buyer.

16. One or more non-transitory computer-readable media maintaining instructions for a buyer application that, when executed by one or more processors of a buyer device associated with a buyer, program the one or more processors to:

receive, from a service computing device, transaction information for a transaction initiated on another device, the transaction information including information about a merchant participating in the transaction with the buyer and item information of one or more items offered by the merchant;

present, on a display associated with the buyer device, a graphical user interface (GUI) that includes the transaction information and an indication of available fulfilment selections for providing a selected item to the buyer, the GUI including at least one of:
 a payment virtual control for authorizing payment for the transaction; or
 a plurality of selectable virtual controls for selecting one of the available fulfilment selections, the selectable virtual controls including a first selectable virtual control for selecting delivery that uses a courier, wherein the buyer application is configured to disable the first selectable virtual control for selecting delivery that uses a courier following elapse of a threshold time and based in part on a spoilage time for the item;

the GUI further including a tracking virtual control for requesting tracking of a location of the buyer device for delivering the item;

send, to the service computing device, based on receiving, via the GUI a selection of a second selectable virtual control an indication to place an order with a fulfilment selection of one of dine-in or take out for the order;

subsequent to placement of the order, send to the service computing device, during preparation of the order and based on receiving selection of the first selectable virtual control and selection of the tracking virtual control, a request to track the location of the buyer device for delivering the item and an indication of a change of the fulfilment selection to delivery that uses a courier, wherein the first selectable virtual control is presented in the GUI based on determining that at least one courier device is within a threshold courier travel time to the merchant location, the threshold courier travel time determined based at least on a predicted courier travel time determined by receiving a current geolocation of the at least one courier device, the change prompting, at least in part, the service computing device to send, to a courier device of the at least one courier device, an instruction to pick up the item from the merchant location; and send, by the buyer application, to the service computing device, periodically, an updated geolocation of the buyer device, wherein sending the updated geolocation causes, at least in part, the service computing device to send, to the courier device, based on an indication that the item is ready for delivery, the updated geolocation of the buyer device and an instruction to deliver the item to the buyer at the updated geolocation.

17. The one or more non-transitory computer-readable media as recited in claim 16, wherein the plurality of selectable virtual controls enable the buyer to select the indicated fulfilment selection from among a plurality of available fulfilment selections, the plurality of available fulfilment selections comprising at least three of: receiving delivery of the selected item via courier; picking up the selected item from the merchant location; receiving the selected item for dining at the merchant location, or receiving a meal kit for preparing the selected item.

18. The one or more non-transitory computer-readable media as recited in claim 16, wherein the other device on which the transaction is initiated is one of:
 a merchant computing device associated with the merchant; or
 a computing device associated with the buyer.

19. The one or more non-transitory computer-readable media as recited in claim 16, wherein the instructions further program the one or more processors to:
 receive an ultrasound signal or a short-range radio signal from at least one of a merchant device associated with the merchant, or a beacon at a merchant location of the merchant; and
 in response to receiving the ultrasound signal or the short-range radio signal, cause the buyer device to transmit a reply ultrasound signal or short-range radio signal including buyer identifying information.

20. The one or more non-transitory computer-readable media as recited in claim 16, wherein the instructions further program the one or more processors to present in the GUI an additional selectable virtual control to enable the buyer to select one or more additional items to add to the transaction.

* * * * *